United States Patent
Shvodian

(10) Patent No.: US 7,110,380 B2
(45) Date of Patent: Sep. 19, 2006

(54) SYSTEM, METHOD, AND COMPUTER PROGRAM PRODUCT FOR SHARING BANDWIDTH IN A WIRELESS PERSONAL AREA NETWORK OR A WIRELESS LOCAL AREA NETWORK

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 967 days.

(21) Appl. No.: 10/067,423

(22) Filed: Feb. 7, 2002

(65) Prior Publication Data

US 2002/0105970 A1    Aug. 8, 2002

Related U.S. Application Data

(60) Provisional application No. 60/267,175, filed on Feb. 8, 2001, provisional application No. 60/266,877, filed on Feb. 7, 2001.

(51) Int. Cl.
*H04J 3/00* (2006.01)

(52) U.S. Cl. .................. 370/336; 370/435; 370/442

(58) Field of Classification Search .............. 370/314, 370/330, 336, 347, 350, 431, 435, 442, 449–463, 370/468, 498
See application file for complete search history.

(56) References Cited

U.S. PATENT DOCUMENTS

| | | | |
|---|---|---|---|
| 5,392,287 A | 2/1995 | Tiedemann, Jr. et al. | |
| 5,684,801 A | 11/1997 | Amitay et al. | |
| 6,115,370 A | 9/2000 | Struhsaker et al. | |
| 6,141,336 A * | 10/2000 | Bauchot et al. | 370/348 |
| 6,570,857 B1 * | 5/2003 | Haartsen et al. | 370/312 |
| 6,587,453 B1 * | 7/2003 | Romans et al. | 370/347 |
| 6,934,752 B1 * | 8/2005 | Gubbi | 709/225 |
| 2002/0071449 A1 * | 6/2002 | Ho et al. | 370/447 |

* cited by examiner

*Primary Examiner*—Chi Pham
*Assistant Examiner*—Phuc Tran

(57) ABSTRACT

A system, method, and computer program product for sharing bandwidth by a plurality of devices in a wireless personal area network or a wireless local area network. A media access control protocol frame includes a beacon signal sent from a coordinator including coordination information to each of the devices of the WPAN, an optional contention access period, and a contention free period that includes an additional shared period that is managed as a slot cycle time division multiple access period, a polling period, or as management period. The coordination information includes a device-unique start time indicator and a transmission duration defining a guaranteed time slot within the contention free period of the frame for each of the networked devices. Each of the network devices sleeps while not receiving the beacon and not transmitting data during their guaranteed time slot, thereby reducing power consumption as compared to slot cycle time division multiple access or polling schemes which require listening by all devices during the contention free period.

42 Claims, 18 Drawing Sheets

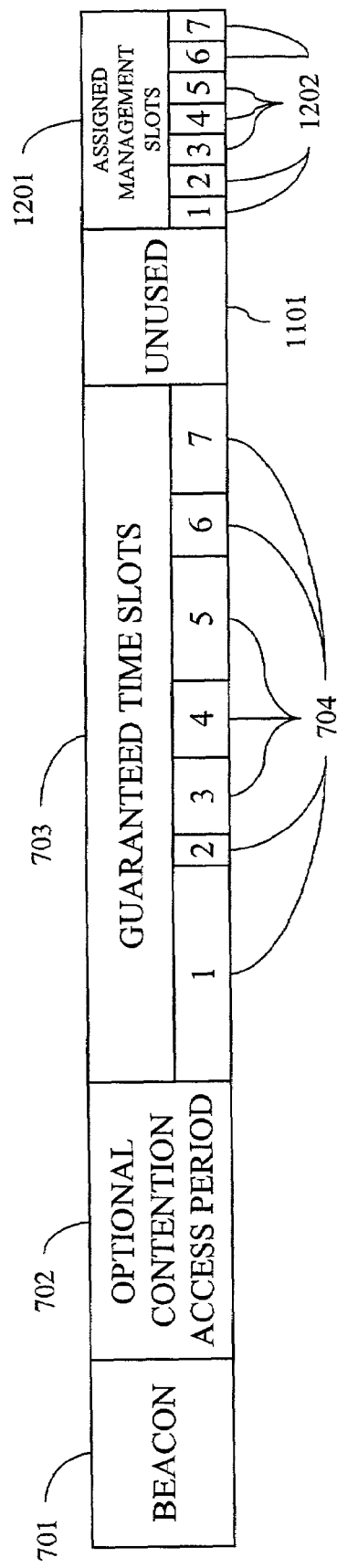
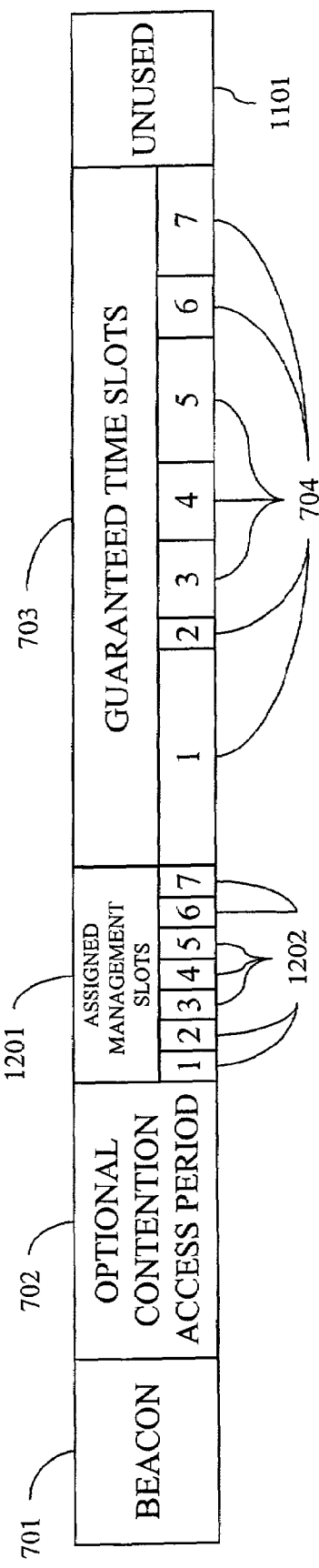
FIGURE 12A
FIGURE 12B

SYSTEM, METHOD, AND COMPUTER PROGRAM PRODUCT FOR SHARING BANDWIDTH IN A WIRELESS PERSONAL AREA NETWORK OR A WIRELESS LOCAL AREA NETWORK

CROSS-REFERENCE TO RELATED PATENT DOCUMENTS

The present document claims the benefit of the earlier filing date of commonly owned, now abandoned U.S. provisional patent applications having common inventors as the present document: Ser. No. 60/266,877 filed Feb. 7, 2001, entitled MAC IMPROVEMENTS TO WIRELESS PERSONAL AREA NETWORKS and Ser. No. 60/267,175 filed Feb. 8, 2001, entitled MAC IMPROVEMENTS TO WIRELESS PERSONAL AREA NETWORKS the entire contents of both which are incorporated herein by reference.

BACKGROUND OF THE INVENTION

1. Field of the Invention:

The present invention relates to wireless personal area networks and wireless local area networks. More particularly, the present invention relates to systems, methods, devices, and computer program products for sharing bandwidth among multiple users in a wireless personal area network or wireless local area network environment.

2. Discussion of the Background:

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard. One of the layers of the OSI model is the data link layer. The data link layer is responsible for placing data into frames that can be communicated at the physical layer of the model and for receiving acknowledgement frames. The data link layer is responsible for error checking as well as retransmission of frames that are not received and acknowledged. The data link layer includes two sublayers, a logical link control sublayer, and a media access control (MAC) sublayer.

In a wireless personal area network (WPAN) or a wireless local area network (WLAN) multiple devices communicate with one another while sharing the bandwidth allocated to the network. Because multiple devices are sharing the same bandwidth, it is necessary to coordinate the use of that bandwidth. A MAC protocol defines how that bandwidth is to be shared among the devices of the WPAN or WLAN.

One MAC protocol proposed for WPANs has taken the form of a slot cycle time division multiple access (TDMA) scheme. In a slot cycle TDMA scheme, each device transmits data in an allocated time slot per cycle. The amount of data that can be transmitted within that time slot is based on a variable slot size managed by a coordinator of the WPAN. In such slot cycle TDMA schemes, the coordinator determines the size of the slot to allocate to a particular user based on the frame size of the data that the user is using.

FIG. 1 illustrates an approach for planning bandwidth allocation in a slot cycle TDMA system. As shown in FIG. 1, a two-dimensional matrix 101 is populated for planning the sharing of the bandwidth by the devices in the network. The two-dimensional matrix represents time on one axis and the usage of bandwidth on the other axis. The partially populated matrix shown in FIG. 1 illustrates that user 1 requires $\frac{1}{3}$ of the available bandwidth. Users 2 and 3, on the other hand, each require $\frac{1}{6}$ of the available bandwidth. Users 4, 5, 6, and 7, each require $\frac{1}{12}$ of the available bandwidth. On the right hand side of FIG. 1, is a fully populated matrix 102 showing two complete cycles 103, 104 for sharing the available bandwidth among seven users. Each row of the matrix represents one frame, and each four frames represent one cycle. It is clear from the fully populated matrix that user 1 is occupying $\frac{1}{3}$ of the available bandwidth whereas users 2 and 3 are each occupying $\frac{1}{6}$ of the available bandwidth, and users 4, 5, 6, and 7 are each occupying $\frac{1}{12}$ of the available bandwidth.

FIG. 2 shows a more a detailed view of a frame in a slot cycle TDMA scheme such as that described in regard to FIG. 1. As shown in FIG. 2, a beacon 201 and a contention access period 202 is transmitted prior to the data fields of a first frame. The period of time between beacons 201 is fixed, and there may be multiple frames transmitted between subsequent beacons 201. A superframe includes not only the beacon 201 and the contention access period 202, but each of the frames sent after that beacon 201 and before a subsequent beacon 201 is sent. The frame shown in FIG. 2 corresponds to the first frame of cycle one 103 shown in FIG. 1. Accordingly, information from users 1, 2, and 4 are transmitted in this frame, which corresponds to the top row of the matrix 102 shown in FIG. 1. Prior to each user's transmission, a request to send (RTS) is transmitted by the user and a clear to send (CTS) is sent by the coordinator to the user telling the user that it is ok to transmit their data. As shown in the frame of FIG. 2, each portion of the frame corresponding to user data 204 is preceded by an RTS/CTS pair 203.

The beacon 201 is used by the controller to maintain synchronization with the users communicating with that controller. The contention access period 202 is the period in which all control messages between the controller and the users are transmitted, for example, it is in this period of time that a user would request to attach to the group sharing the bandwidth being controlled by the particular controller.

FIG. 3 illustrates exemplary frames for carrying out the bandwidth allocation shown in FIG. 1. As shown in FIG. 3, the frames can be grouped into two groups corresponding to superframe one 301, and superframe two 302. Each of the superframes includes a beacon and a contention access period, followed by successive groups of RTS/CTS pairs and their associated user data. Frames 1 and 3 of superframe two 302 illustrate the concept of a mini slot 303. A mini slot occurs when a user does not use the time slot reserved for them. For example, in frame 1 of superframe two 302 the time slot after user 1 was reserved for user 2 (as indicated in the second cell of the first row of the matrix 102 corresponding to cycle two 104 shown in FIG. 1). Similarly, the mini slot 303 in frame 3 of superframe two 302 corresponds to the time slot reserved for user 6 (as shown by the third cell of the third row of the matrix 102 corresponding to cycle two 104 in FIG. 1).

A slot cycle TDMA scheme requires that each node connected to a coordinator listen to the beacon 201 in order to receive coordination information pertaining to the present superframe. However, each node must continue to listen throughout the superframe so as to monitor the channel for the presence of RTS/CTS pairs corresponding to each particular node's time slot. Each node must keep track as the connected nodes use each time slot. For example, if a particular node has been assigned a time slot beginning at a set time, that user must track RTS/CTS pairs corresponding to those users occupying time slots before that user. This must be done so that users can adjust their assigned slot start time to account for users who have not used their allocated time slot. For example, as shown in FIG. 3, user 2 did not use its assigned time slot in the first frame of superframe two 302, as indicated by the presence of a mini slot 303. In this situation, user 4 must be listening so as to detect the absence of a CTS, which would have been sent by the controller to user 2 in response to an RTS request sent to the controller by user 2. In the examples shown in FIG. 3, user 2 never requested to use its time slot, and therefore, the mini slot (silent period) must be detected by user 4, so that user 4 can move up its scheduled start time so that the time allocated to user 2 that is not being used is not wasted. Once user 4 detects a mini slot, user 4 can send an RTS to the controller requesting permission to begin its transmission. The controller will send the CTS to user 4 authorizing user 4 to begin its transmission since the controller is aware that user 2 has forfeited their time slot. Accordingly, inherent with a slot cycle TDMA scheme, is the need for each user to listen to the controller at all times, not only in order to receive the initial slot assignment, but also to track the use of the allocated slots by each connected user. Furthermore, each user must transmit an RTS to the controller prior to each transmission.

The requirement to listen to the controller at all times, and to transmit an RTS to the controller prior to each transmission impacts the power consumption of each of the individual users. Moreover, since each user must track the use of each frame, the result is that the coordination of a time frame is not handled entirely by the coordinator, but rather, is a distributed function shared by not only the coordinator, but also each user connected to the coordinator. A slot cycle TDMA scheme also requires that the coordinator listen at all times so that corresponding CTS messages may be sent in response to each of the RTS messages received by the individual users.

FIG. 4 illustrates another disadvantage to slot cycle TDMA systems. Because the allocated slots are of a variable length, it is possible to have a situation where one user dominates the available bandwidth. Slot durations in slot cycle TDMA systems are determined based on the packet sizes of the data being transmitted by the users of the network. As shown in the example of FIG. 4, user 1 requires a slot in each frame of the superframe. However, if user 1 is transmitting large packets of data, it cannot be said that providing user 1 with ⅓ of the slots is synonymous with allocating user 1 with ⅓ of the bandwidth. Depending on the size of the slots, it is quite possible that a situation of slot cycle "unfairness" will exist, wherein one user is dominating the available bandwidth to a degree not proportional to the number of slots allocated to that user.

FIG. 5 illustrates a polling scheme for sharing bandwidth among several users. As shown in FIG. 5, rather than exchanging an RTS/CTS between the individual users and the coordinator, the coordinator polls the individual users prior to each allocated slot. Polling schemes suffer similar disadvantages to those described above in the context of the slot cycle TDMA scheme, such as, for example, the need to listen to the coordinator at all times.

SUMMARY OF THE INVENTION

The inventor of the present invention has recognized that slot cycle time division multiple access (TDMA) and polling media access control (MAC) protocols have features that are disadvantageous when used in a wireless personal area network (WPAN) or a wireless local area network (WLAN). Accordingly, one object of the present invention is to provide a solution to this problem, as well as other problems and deficiencies associated with slot cycle TDMA and polling MAC protocols.

The inventor of the present invention has recognized that an important design consideration of devices to be used in a WPAN or WLAN is power consumption. Because WPAN devices are typically battery powered, a design that can maximize battery life will be advantageous. Accordingly, a further object of the present invention is to provide a MAC protocol that will allow devices complying with the protocol to maximize their battery life.

The inventor of the present invention has also recognized that a slot cycle TDMA MAC protocol is not a "fair" scheme for sharing bandwidth. Accordingly, yet another object of the present invention is to provide a MAC protocol through which the sharing of the bandwidth among the users of the network is through a fair scheme.

The above-described and other objects are addressed by the present invention, which includes a novel computer-based system, method, and computer program product through which bandwidth can be shared in a fair and power-efficient manner. The invention makes use of guaranteed time slots that have a limited duration, thereby ensuring a fairer sharing of the bandwidth among the users. Furthermore, the invention includes a scheme whereby the users of the network do not need to constantly listen to a coordinator in order to determine when to transmit.

In one embodiment, the present invention is implemented as a system wherein a controller issues a beacon that provides time slot assignments for each of the users of the network. The beacon is followed by an optional contention access period, which is then followed by a contention free period that makes use of guaranteed time slots for each of the users desiring time to transmit in a particular MAC superframe.

In another embodiment of the present invention, the contention free period is divided into a portion including the guaranteed time slots, and another portion including time allocated for random access management slots.

In yet another embodiment of the present invention, the contention free period is divided into a first portion including the guaranteed time slots, and a second portion including time for assigned management slots.

In yet another embodiment of the present invention, the contention free period is split into at least two portions, one portion of which being allocated to the guaranteed time slots, and another portion including time that may be shared using a slot cycle TDMA or a polling scheme.

In other embodiments of the present invention, several piconets can share bandwidth by aligning their frames using a scheme according to the present invention whereby the unassigned time of a frame belonging to a first piconet corresponds to the assigned time of a frame from another piconet.

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS."

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 12A and 12B illustrate exemplary MAC superframes having guaranteed time slots, an unused portion, and assigned management slots during the contention free period according to one embodiment of the present invention;

DESCRIPTION OF THE PREFERRED EMBODIMENTS

Figure 1:
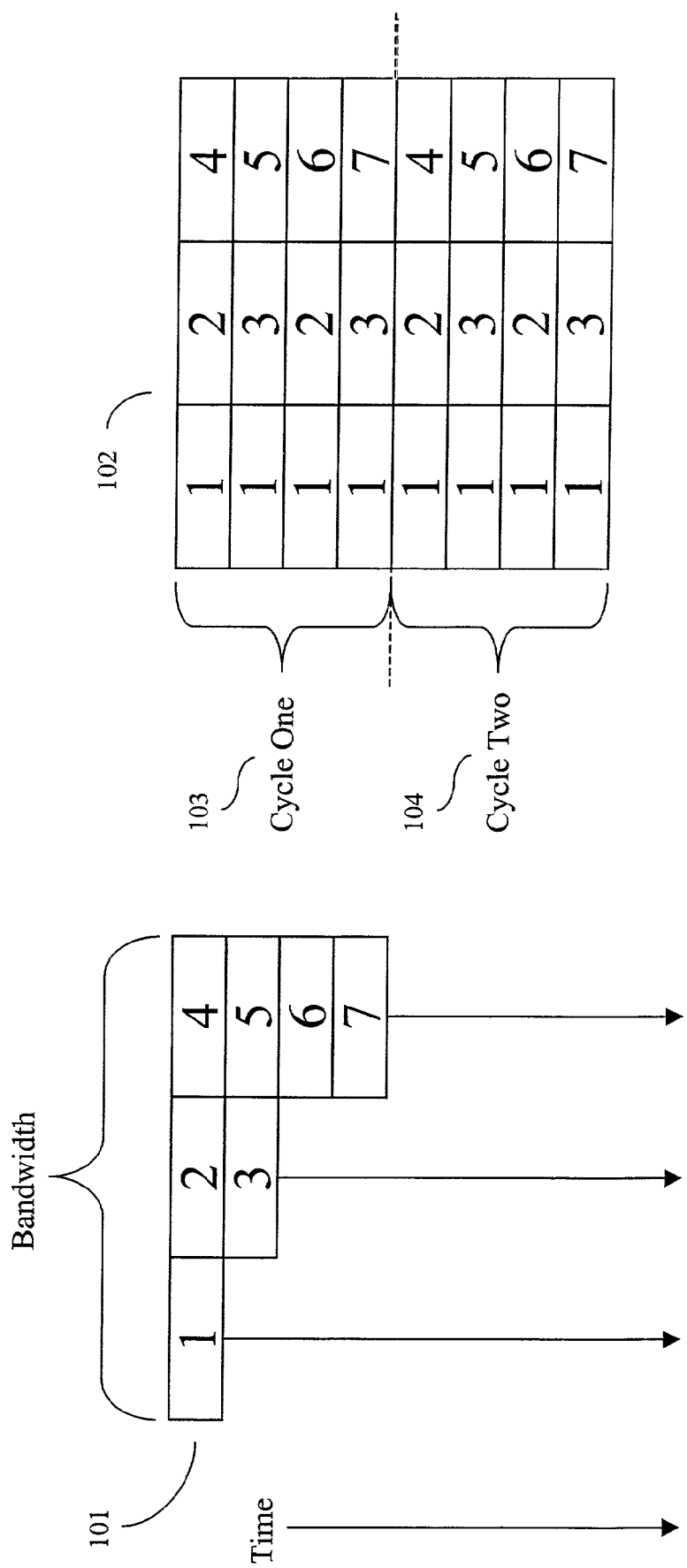
FIG. 1 is a diagram illustrating the use of a matrix for allocating bandwidth among the users of a network.
Figure 2:
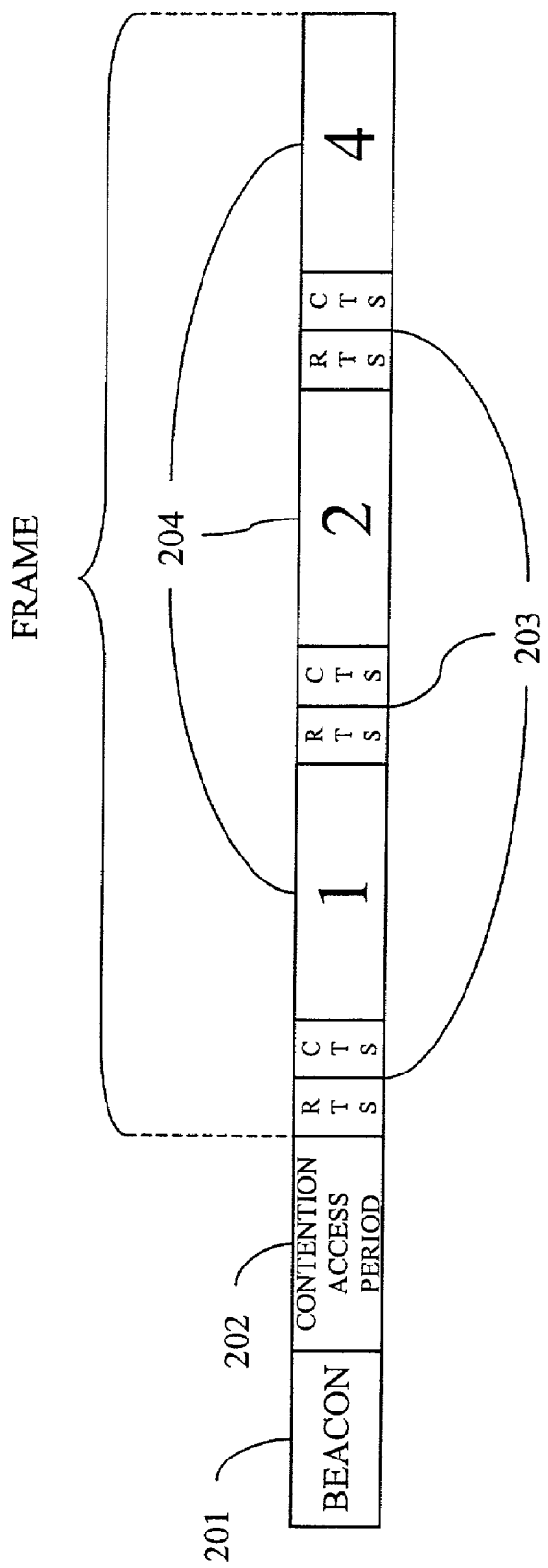
FIG. 2 illustrates an exemplary structure of a superframe including a single frame under a slot cycle TDMA scheme.
Figure 3:
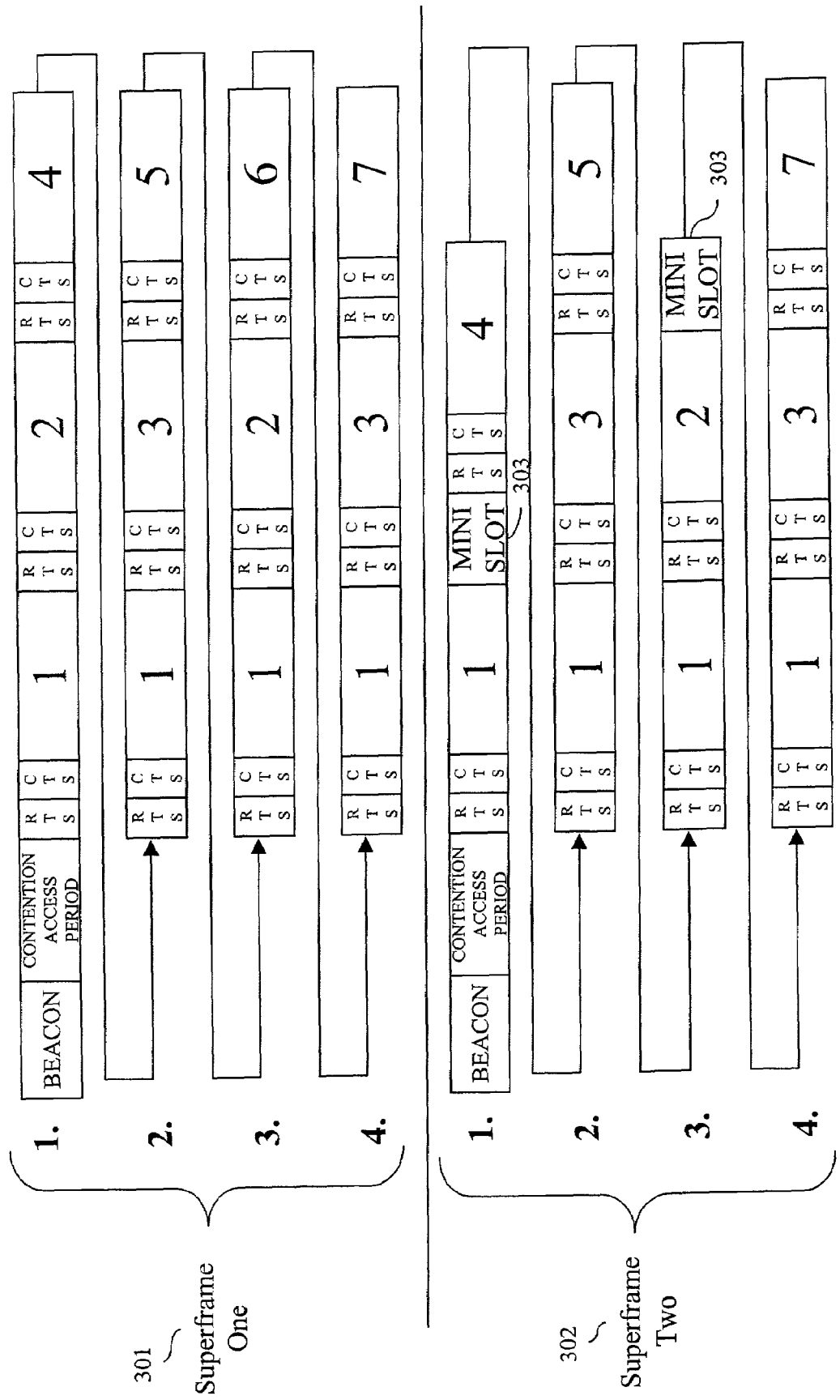
FIG. 3 illustrates exemplary frames under a slot cycle TDMA scheme for sharing bandwidth according to the allocations of the examples shown in FIG. 1.
Figure 4:
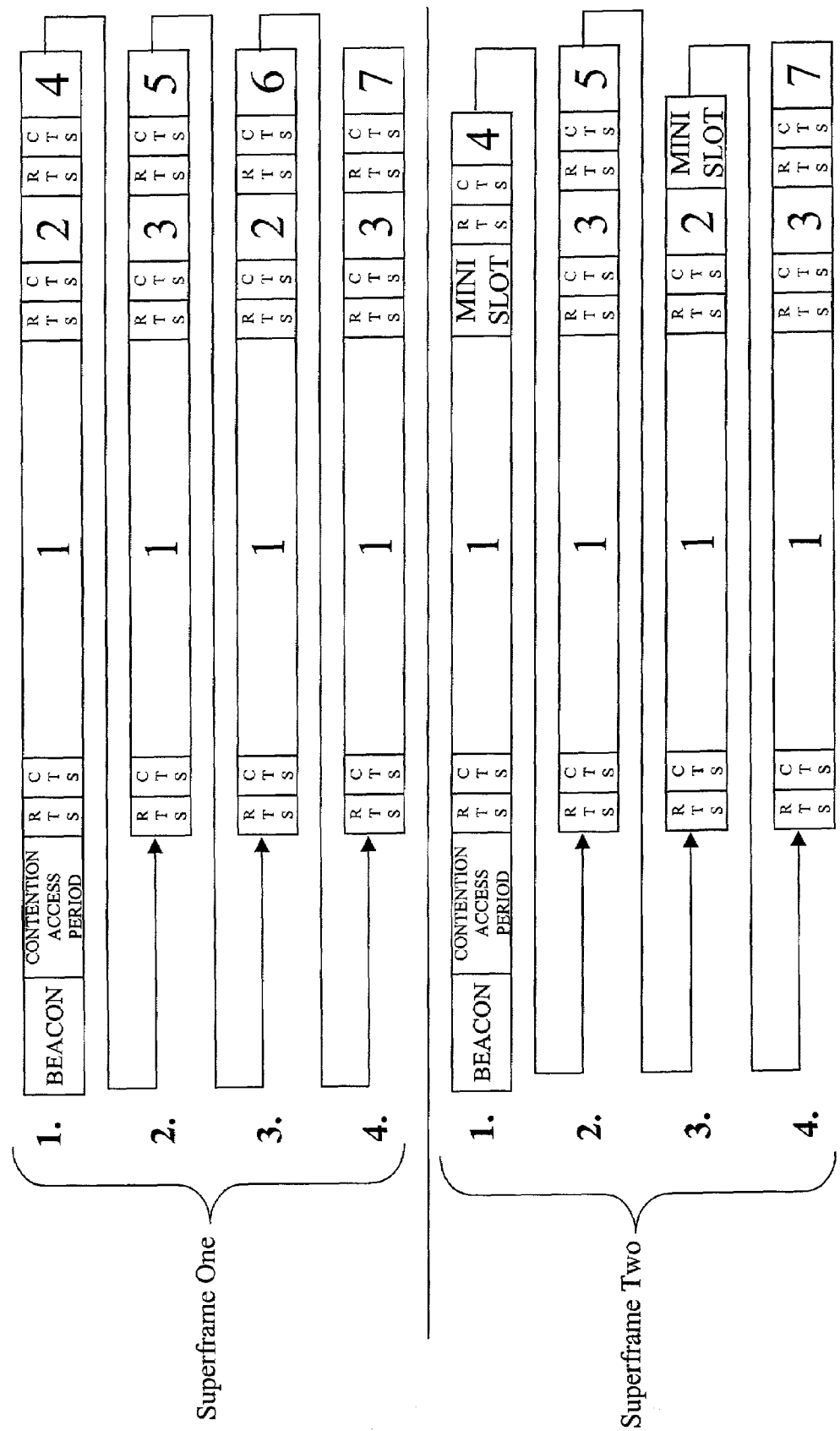
FIG. 4 illustrates exemplary frames under a slot cycle TDMA scheme illustrating slot cycle "unfairness"
Figure 5:
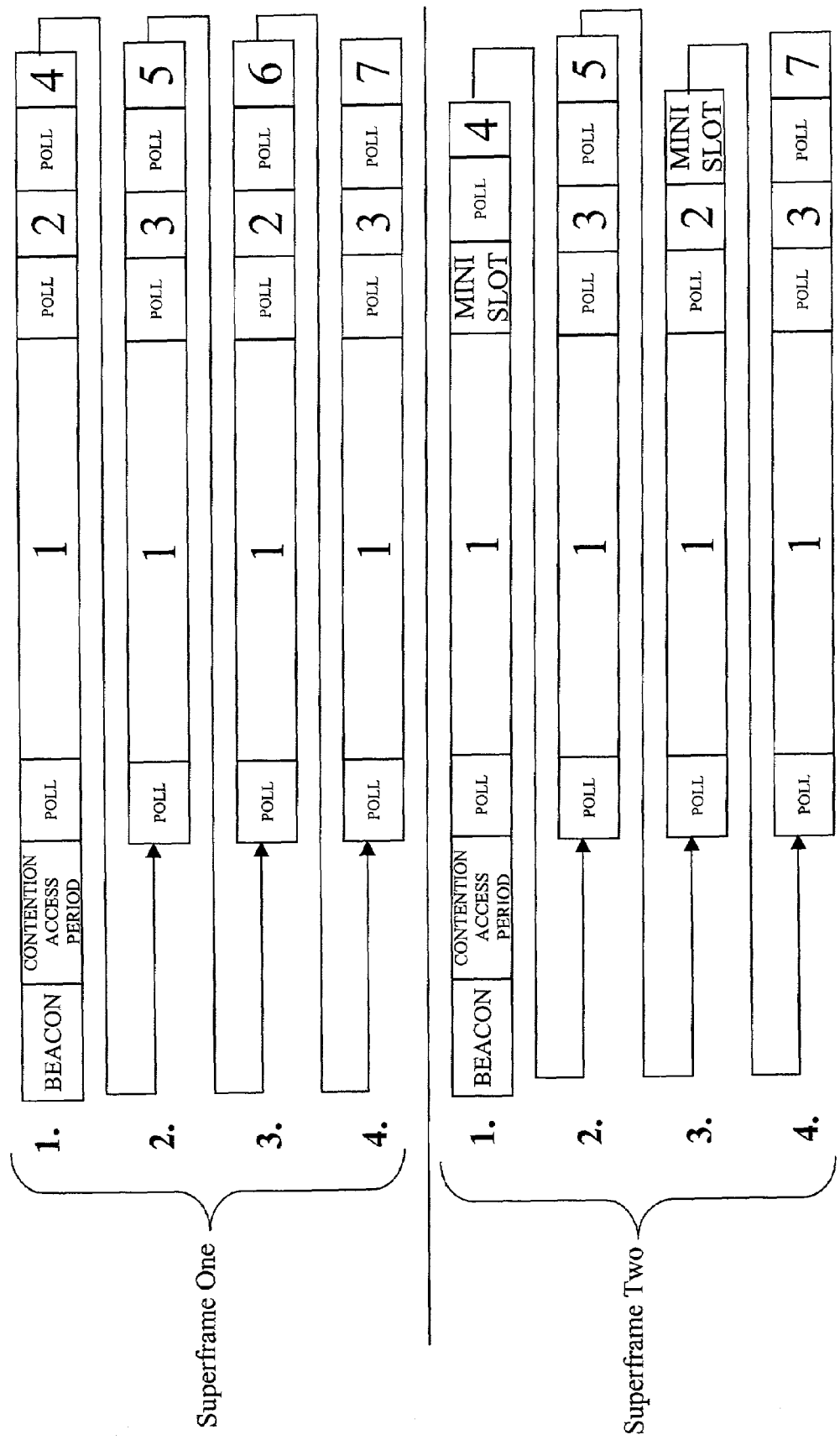
FIG. 5 illustrates a polling scheme for sharing bandwidth.
Figure 6:
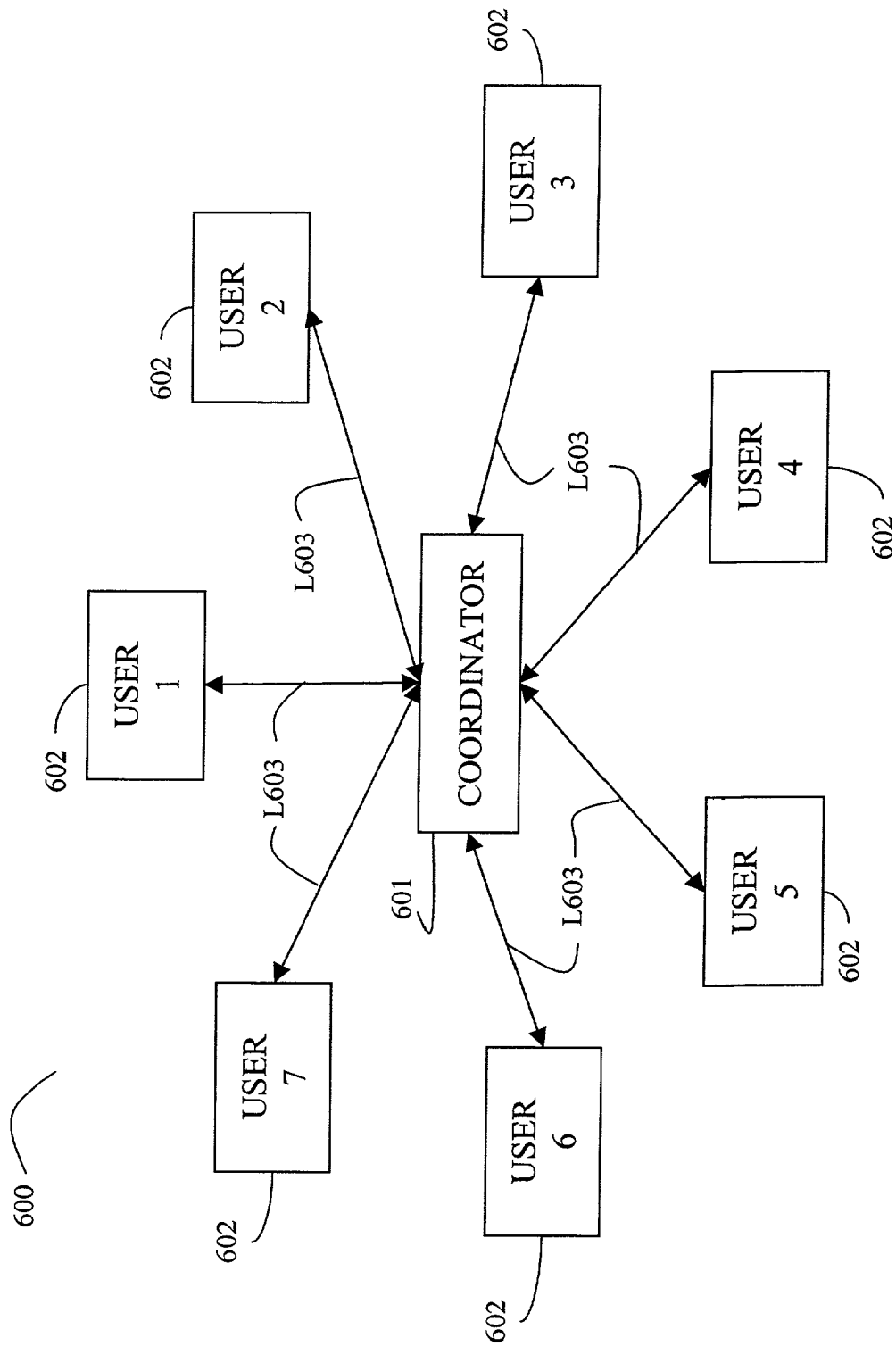
FIG. 6 is a block diagram of a wireless personal area network.

Referring now to the figures, wherein like reference numerals designate identical or corresponding parts throughout the several views, and more particularly to FIG. 6, which is a block diagram of a wireless personal area network (WPAN) 500. While the embodiments described herein will be in the context of a WPAN, it should be understood that the present invention also applies to other settings where bandwidth is to be shared among several users, such as, for example, wireless local area networks (WLAN). As shown in FIG. 6, the WPAN includes a coordinator 601, and a plurality of users 602, each of which is connected to the coordinator 601 via a wireless link L603. Each user 602 of the WPAN may be a different wireless device, for example, a digital still camera, a digital video camera, a personal data assistant (PDA), a digital music player, or other personal wireless device.

WPANs are networks that are typically used to share information between personal electronic devices. Accordingly, most users (or nodes) of WPANs are small battery-operated devices. With such devices, it is advantageous to minimize the size of the device as well as the power consumption, thereby extending battery life.

Typically, a WPAN is confined to within a house, an office, a floor of a building, etc. Each of the users 602 shares the same bandwidth. Accordingly, the coordinator 601 coordinates the sharing of that bandwidth. Standards have been developed to establish protocols for sharing bandwidth in a wireless personal are network setting. For example, the IEEE standard 802.15.3 provides a specification for the media access control (MAC) and physical layers (PHY). The MAC protocol defines frames through which the sharing of the bandwidth by the users 602 is managed by the coordinator 601 and/or the users 602.

Figure 7:
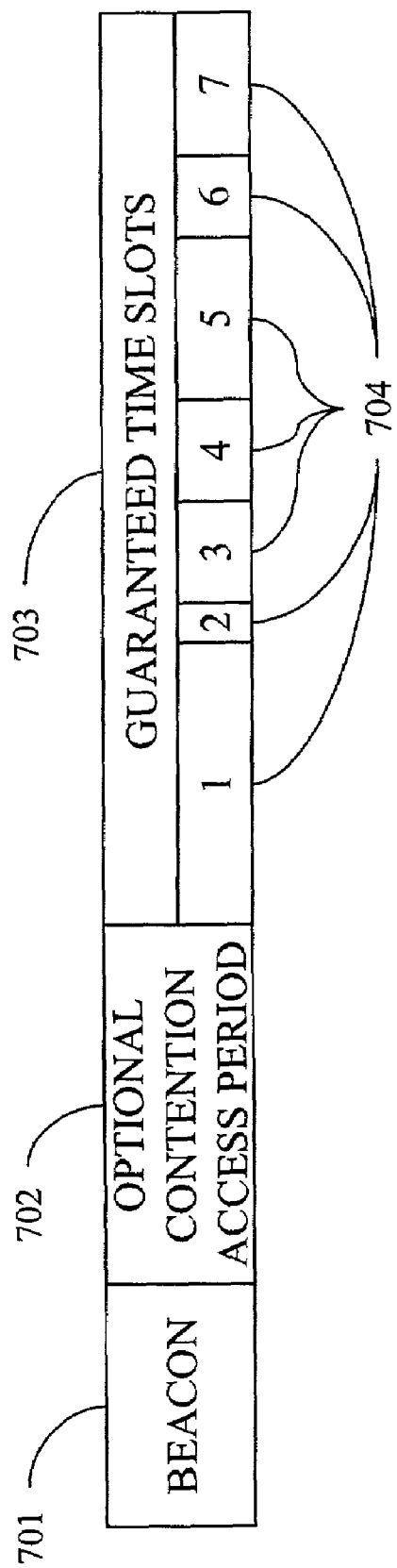
FIG. 7 illustrates an exemplary MAC superframe having guaranteed time slots during the contention free period according to one embodiment of the present invention.

FIG. 7 illustrates the structure of a MAC superframe according to one embodiment of the present invention. As shown in FIG. 7, the frame includes a beacon 701, an optional contention access period 702, and a guaranteed time slot portion 702. Within the guaranteed time slot portion 703, are the individual time slots 704 corresponding to the users 702 of the network 701. The exemplary frame shown in FIG. 7 includes guaranteed time slots 704 corresponding to each of the users 702 of the WPAN 600 shown in FIG. 6.

The beacon 701 is used by the coordinator 601 to coordinate the scheduling of the individual users 602 into their respective guaranteed time slots 704. All users 602 listen to the coordinator 601 during the beacon period 701. Each user 602 will receive a respective guaranteed time slot 704 start time and duration from the coordinator 601 during the beacon period 701. In one embodiment of the present invention, each user 602 will also receive respective guaranteed time slots 704 start times and duration from the coordinator 601 indicating when that user 602 needs to awake to receive a transmission from, for example, another of the users 602. The beacon period 701, therefore, is used to coordinate the users 602 transmitting and receiving.

Following the beacon 701 is an optional contention access period 702. The optional contention access period 702 is used for communicating control messages between the users 602 and the coordinator 601. In those embodiments of the present invention where the contention access period is not included, the users 702 communicate with the coordinator 601 through management slots included in the superframe and described in various embodiments hereinbelow. If a new user 602 desires to be added to the network 600, it is during the optional contention access period 702 that the new user 602 will request the coordinator 601 to be added to the network 600. If a particular user 602 has no need to coordinate with the coordinator 601 during the optional contention access period 702, that user 602 may remain silent during the optional contention access period 702, and moreover, need not listen to the coordinator 601 during the optional contention access period 702.

Following the optional contention access period 702, is the guaranteed time slot period 703 during which each of the individual users 602 transmit data during their corresponding exclusive guaranteed time slots 704. In the example shown in FIG. 7, each of the users 602 of the network 600 has been granted a guaranteed time slot 704 of varying length. Since each particular user 602 knows their transmit start time and duration from information received during the beacon period 701, each user 602 can remain silent until it is their turn to transmit. Moreover, each user 602 need not listen during the guaranteed time slot period 703, since that period of time has been fully coordinated by the coordinator 601 during the beacon period 701.

The present invention, as described in the context of FIG. 7, provides several advantages over other schemes for sharing bandwidth among a plurality of users 602 of a wireless network 600. The advantages provided are particularly applicable in a WPAN or WLAN environment. As compared to a slot cycle TDMA scheme, the complexity and power consumption required by the user 602 devices is lower in the inventive protocol. As discussed above in the "BACKGROUND OF THE INVENTION" section, the coordination of the sharing of the bandwidth is distributed between both the controller and the users. For example, while a user receives a slot time during the beacon period under a slot cycle TDMA approach, that user must also listen and process events occurring throughout the contention free period. It is necessary for each user to listen continuously since the slots may move in time should a particular user not use their particular slot (i.e., the occurrence of a mini-slot). As a user is ready to use their time slot in a slot cycle TDMA scheme, that user must transmit an RTS signal to the coordinator, and wait for the return of an CTS signal from the coordinator indicating that it is now okay to transmit. The present inventors recognized that under a slot cycle TDMA scheme, the user devices play a significant role in the coordination of the sharing of the bandwidth. It was the inventor of the present invention that recognized that by reducing the role of the user devices in a WPAN environment, that power consumption in the user devices could be lowered, and thereby extend the battery life of the end user devices. By having a fully-coordinated guaranteed time slot period 703 in the frame, it is unnecessary for the individual users to listen during the guaranteed time slot portion 703 of the MAC frame. Moreover, since each user has been assigned a guaranteed time slot during the beacon period 701, it is unnecessary for each user to send an RTS signal to the coordinator 601 prior to transmitting. Accordingly, each user need only listen during the beacon period 701 in order to get their guaranteed time slot assignment, and can be entirely dormant at all other times, other than when they are using their guaranteed time slot 704. Of course, if control communications need to be performed with the coordinator 601, that user would need to perform those communications during the optional contention access period 702 or throught management slots.

In order to highlight the differences between a slot cycle TDMA scheme as discussed in the "BACKGROUND OF THE INVENTION" section and a guaranteed time slot approach of the present invention, a description of the processing required for each will be provided.

Figure 8A:
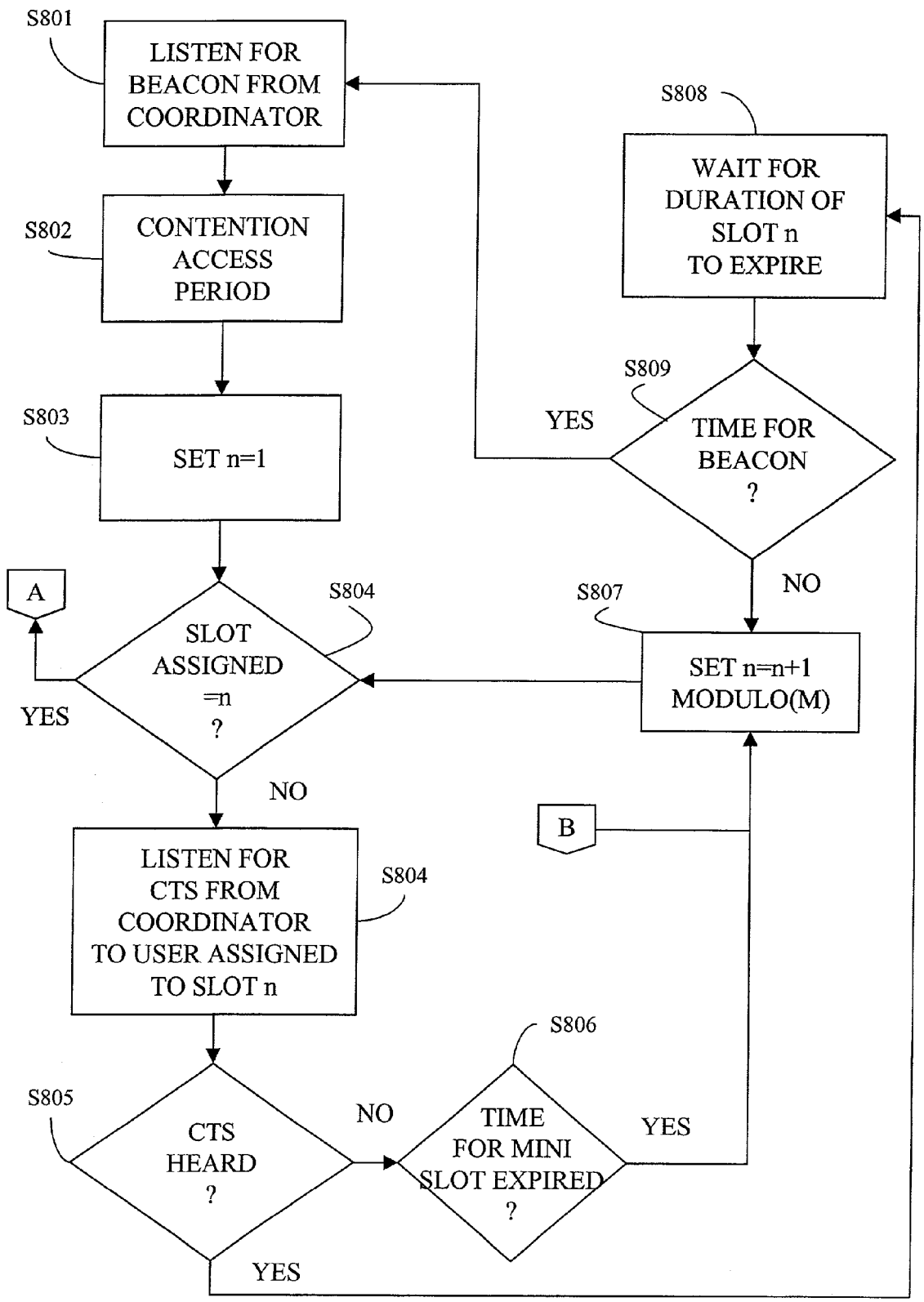
FIGS. 8A and 8B are a flow diagram showing a process through which multiple users share bandwidth using a slot cycle TDMA scheme.
Figure 8B:
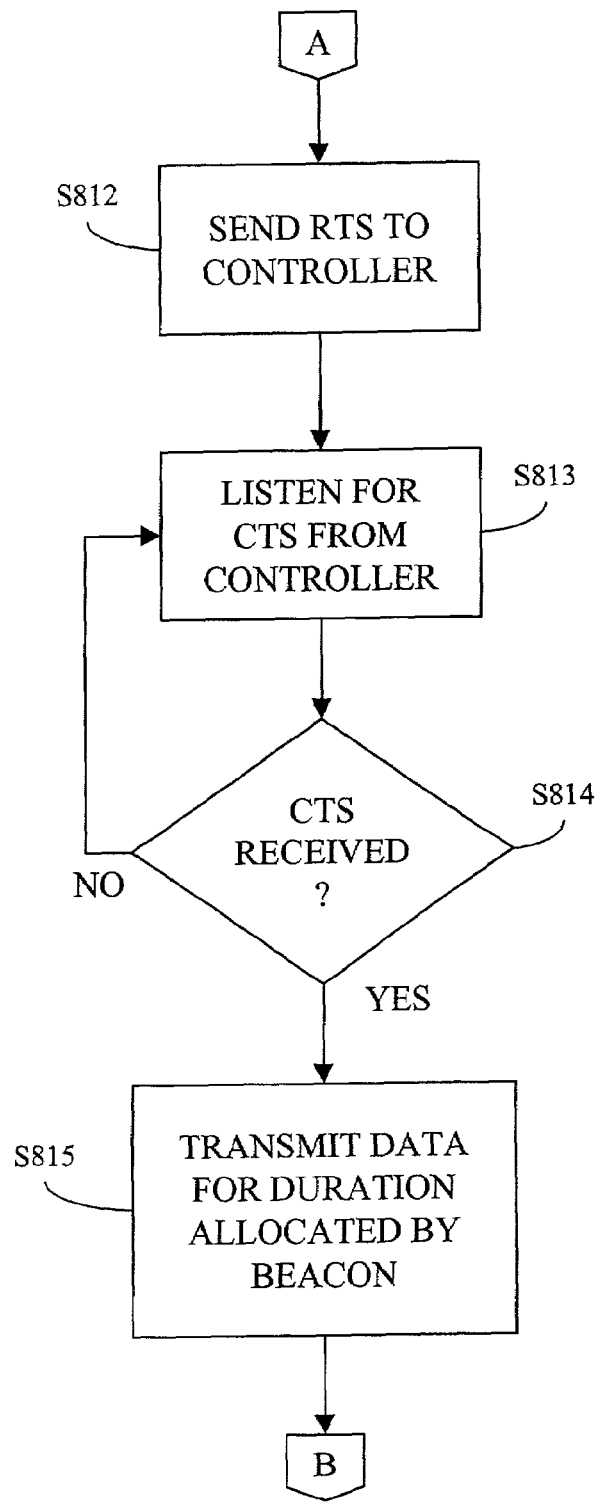

FIGS. 8A and 8B are a flow diagram of the processing required in a slot cycle TDMA scheme. As shown in FIG. 8A, the process begins at step S801 where each user listens for a beacon from the coordinator. After the beacon has been received, the process proceeds to step S802 during which the contention access period is performed. As discussed above, control communications between individual users and the coordinator may be performed during the contention access period. The process then proceeds to step S803 where an internal variable n is set equal to 1. This step marks the beginning of the contention free period.

During the contention free period each individual user is keeping track of the present slot (as indicated by the internal counter n). At step S804 each individual user determines whether the present slot corresponds to the slot to which they are assigned. If it is determined that the present slot is not their slot, the process proceeds to step S804 where each user not assigned to the present slot will listen for a CTS signal to be sent from the coordinator to the user that is assigned to the present slot. This CTS signal will have been sent by the coordinator in response to an RTS signal sent by the user assigned to the present slot. The process then proceeds to step S805 where it is determined whether the individual users not assigned to the present slot have heard a CTS signal. If a CTS signal has not been heard (i.e., "NO" at step S805), the process proceeds to step S806 where the individual users not assigned to the present slot will determine if enough time has expired from the end of the previous user's slot so as to define a mini-slot. As discussed above, a mini-slot corresponds to a "dead" period, which indicates that a particular user is not using their assigned time slot. If it is determined that a mini-slot has occurred (i.e., "YES" at step S806), the process proceeds to step S807 where the internal counter is incremented (modulo(M), where M is the number of slots per cycle) by each user so as to begin processing the next contiguous slot.

If it is determined at step S805 that a CTS signal has been heard (i.e., "YES" at step S805), the process proceeds to step S808 where the users not assigned to the present slot will wait for the duration of the present slot to expire. Once the duration of the present slot has expired, the process proceeds to step S809 where it is determined whether the present slot is the last slot in the superframe (i.e., the next beacon is due). If it is determined that the beacon is due (i.e., "YES" at step S809), the process returns to the first step, step S801, where the users begin listening for the beacon corresponding to the next superframe. If, on the other hand, it is determined that the beacon is not due (i.e., "NO" at step S809), the process proceeds to step S807 where the internal counter is incremented (modulo(M)) and the users begin to process the next contiguous slot. In processing the next contiguous slot, the process proceeds to step S804 where, again, each user determines whether or not the present slot is the slot to which they are assigned.

If it is determined at step S804 that the present slot is the slot assigned to a particular user (i.e., "YES" at step S804), the process proceeds to step S812 shown in FIG. 8B.

As shown in FIG. 8B the first step for a user device during that device's time slot is to send an RTS signal to the controller requesting from the controller permission to begin transmission. The process then proceeds to step S813 where the user will listen for a CTS signal in return from the controller. The process then proceeds to step S814 where it is determined whether the CTS signal has been received. If the CTS signal has not been received (i.e., "NO" at step S814), the process returns to step S813 where the user will continue to listen for a CTS signal from the controller. If, on the other hand, the CTS signal has been received (i.e., "YES" at step S814), the process proceeds to step S815 where the user begins to transmit their data for a duration that was allocated during the beacon period. Once the user has completed with their transmission at step S815, the process proceeds to step S807 shown in FIG. 8A where the internal counter corresponding to the present slot is incremented.

Figure 9:
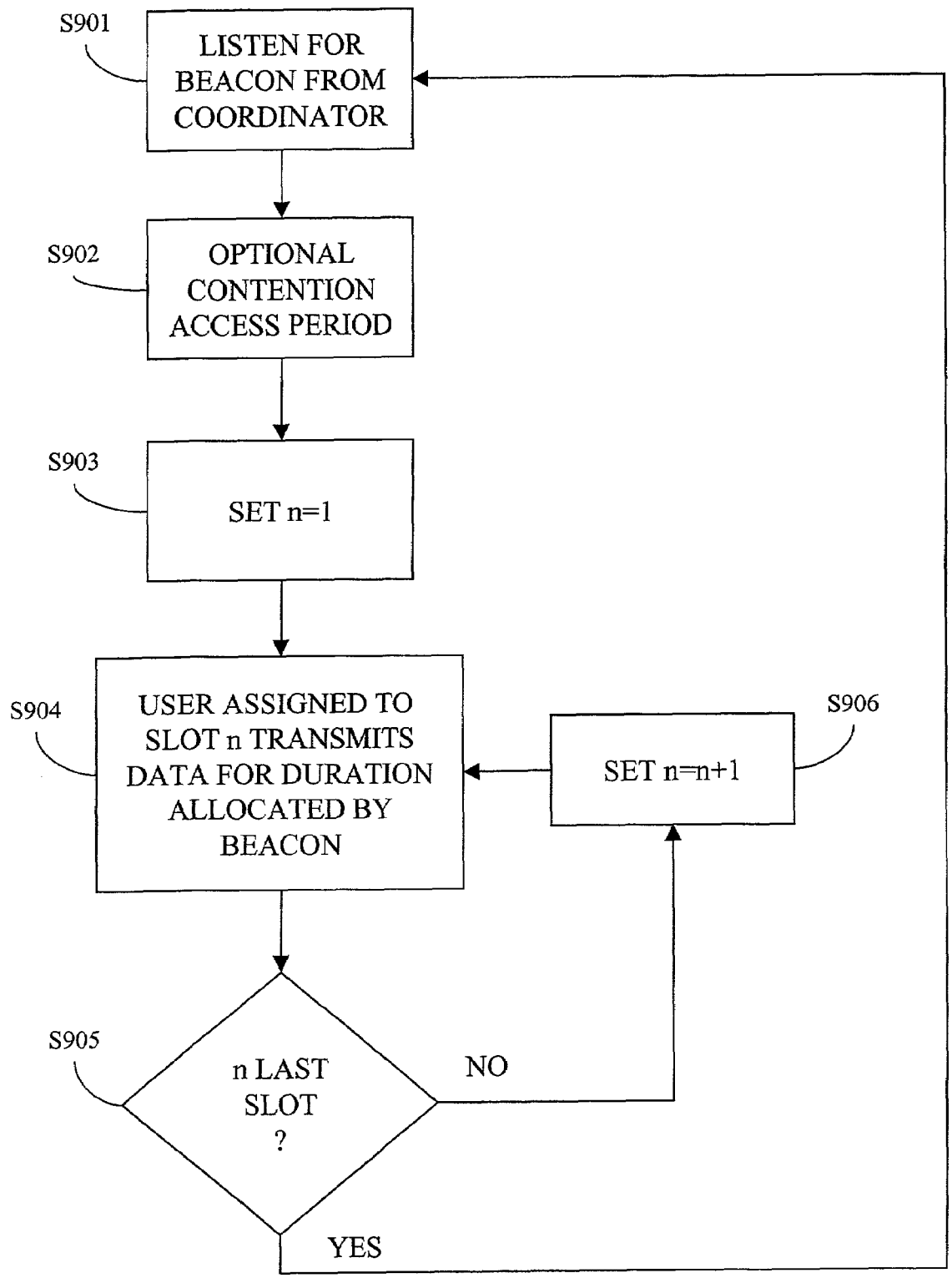
FIG. 9 is a flow diagram showing a process through which users share bandwidth using a guaranteed time slot scheme according to one embodiment of the present invention.

FIG. 9 is a flow diagram of the processing performed during a particular frame according to one embodiment of the guaranteed time slot scheme of the present invention. As shown in FIG. 9, the process begins at step S901 where each of the users 602 of the network 600 listens for the beacon from the coordinator 601. The process then proceeds to step S902 during which the optional contention access period is handled. As discussed above, if no control communications with the coordinator 601 are required, the users 602 can remain asleep (i.e., not receiving, and not transmitting) during this period. The process then proceeds to step S903 where an internal counter corresponding to a present time slot is set to 1. The process then proceeds to step S904 where the user assigned to the guaranteed time slot corresponding to the present slot wakes up and transmits data for the duration allocated during the beacon period, and then returns to sleep. The process then proceeds to step S905 where it is determined whether or not the present slot is the last slot of the superframe. If it is determined that the present slot is not the last slot in the frame (i.e., "NO" at step S905), the process proceeds to step S906 where the internal slot counter is incremented. The process then proceeds to step 904 where the user corresponding to the incremented slot number wakes up, transmits their data, again for the duration allocated during the beacon period, and then returns to sleep. During this loop (i.e., steps S904, S905, and S906), the individual user devices 602 not presently transmitting, sit sleeping, until it is their turn to transmit, at which time they will wake up, transmit, and return to sleep. Accordingly, it is not necessary for the individual user devices to listen during other user's time slots, nor is it necessary for each user to send an RTS signal to the coordinator 601 and listen for a return CTS signal prior to beginning their transmission. Instead, the guaranteed time slot scheme according to the present invention increases the sleep time of the user devices 602, and accordingly, will allow for increased battery life of those devices 602.

Another advantage of the guaranteed time slot approach of the present invention over slot cycle TDMA schemes is that slot cycle fairness may be more effectively managed by the coordinator 601. By guaranteeing time, rather than slots, a more equitable sharing of the bandwidth is achievable. Under the guaranteed time slot approach of the present invention, the unit of sharing is bandwidth (in terms of time), and not slots. As was discussed above in the "BACKGROUND OF THE INVENTION" section, a sharing of slots of variable length corresponding to packet lengths such as is done in slot cycle TDMA schemes, an inequitable sharing of the bandwidth can result.

FIGS. 10–16 illustrate exemplary variations of the guaranteed time slot scheme for sharing bandwidth. Each of these variations includes a guaranteed time slot period 703 during which all non-transmitting user devices 602 may remain idle, and not listening, thereby reducing battery consumption.

Figure 10:
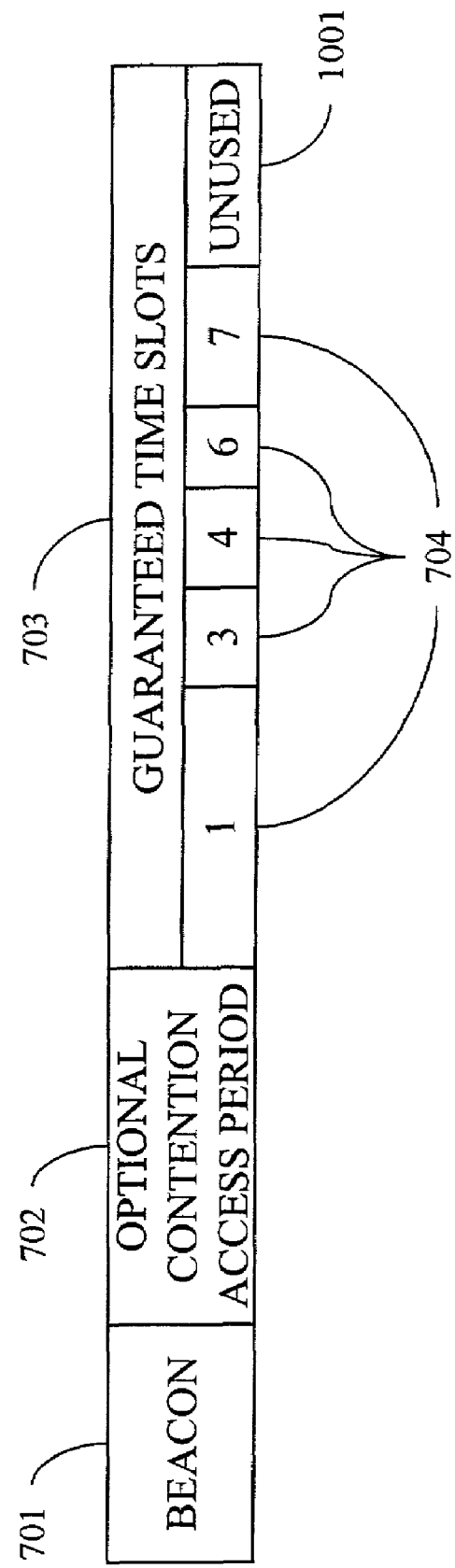
FIG. 10 illustrates an exemplary MAC superframe having guaranteed time slots and an unused portion in the contention free period according to one embodiment of the present invention.

FIG. 10 illustrates an exemplary MAC superframe where the guaranteed time slot period 703 is not completely used. As shown in FIG. 10, the guaranteed time slot period 703 includes guaranteed time slots 704 for users 1, 3, 4, 6, and 7. Accordingly, users 2 and 5 have communicated to the coordinator 601, through a control message sent during the optional contention access period 703, for example, that they do not have any data to transmit during this superframe. Accordingly, the superframe includes an unused portion 1001.

Figure 11A:
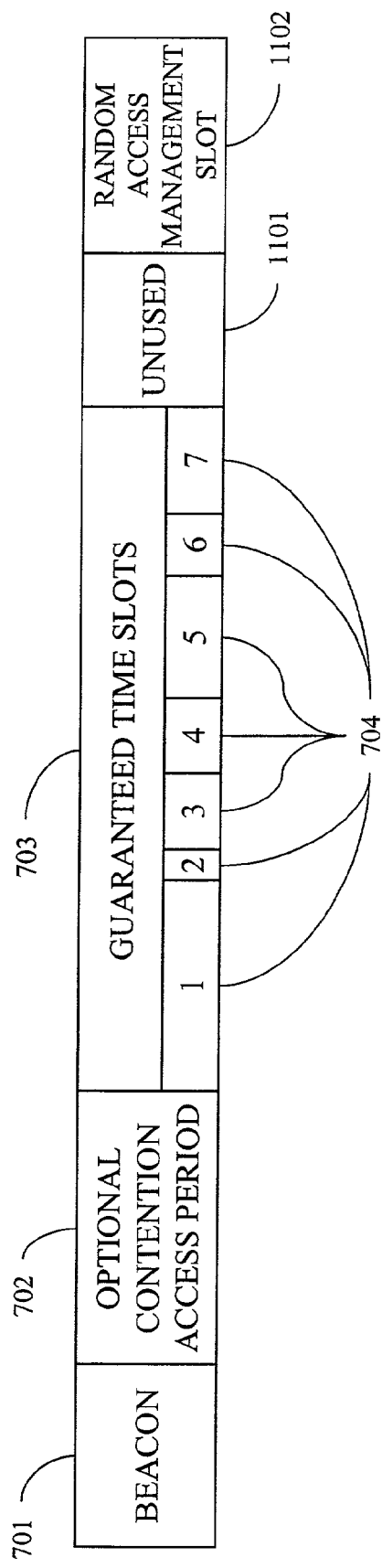
FIGS. 11A and 11B illustrate exemplary MAC superframes having guaranteed time slots, an unused portion, and random access management slots during the contention free period according to one embodiment of the present invention.

FIG. 11A illustrates another exemplary MAC superframe according to the present invention including a guaranteed time slot period 703, an unused portion 1101, and a random access management slot period 1102. As shown in FIG. 11A, the guaranteed time slot period 703 includes the guaranteed time slots 704 for each of the users 602 of the network 600. Following the guaranteed time slot period is an unused period 1101, which is then followed by a random access management slot period 1102. The unused period 1101 corresponds to the unused guaranteed time slots. Accordingly, in an example where all guaranteed time slots for a particular superframe were used, that superframe would not include an unused period 1101. The random access management slot period 1102 is a period during which, in one embodiment, users requiring additional time per frame can place requests to the coordinator 601 for additional time in subsequent frames. As discussed above, in some embodiments of the present invention, the optional contention access period 702 is not included in the superframe, and all coordination between the users 602 and the coordinator 601 is handled through the management slot period 1102. In the example shown in FIG. 11A, the random access management slot period 1102 is managed by the coordinator 601 using a first-come, first-served scheme. For example, since each user device 602 may request addition time in subsequent frame during the single random access management slot period 1102, it is quite possible that some of those requests will not be heard by the coordinator 601.

Figure 11B:
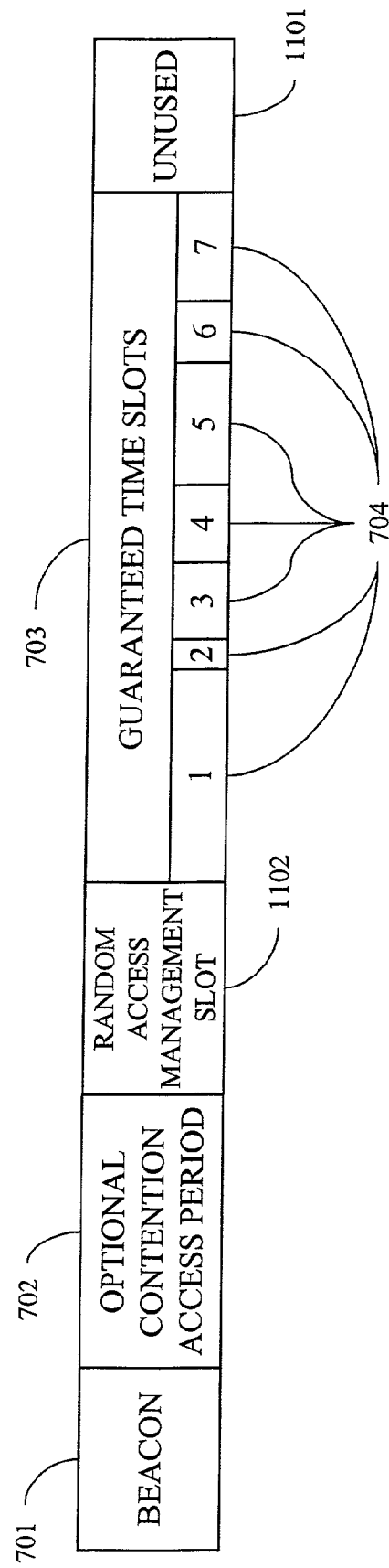

FIG. 11B illustrates a variation of the MAC superframe shown in FIG. 11A. As shown in FIG. 11B, the random access management slot period 1102 may be positioned in the superframe to be at the beginning of the contention free period, before the guaranteed time slot period 703.

FIG. 12A illustrates yet another exemplary MAC superframe having guaranteed time slots according to the present invention. The superframe shown in FIG. 12A is similar to that shown in FIGS. 11A and 11B, with the exception that the management slotperiod is an assigned management slot period 1201 in this superframe. The assigned management slot period 1201 includes an individual pre-assigned management slot 1202 for each user device 602 in the network 600. Using the scheme shown in FIG. 12A, each user device 602 will have a guaranteed opportunity to request additional time in subsequent frames. As with the guaranteed time slot period 703, each individual user device 602 need only wake up and transmit any reservation or other coordination requests during their particular assigned management slot period 1202, again, allowing the user devices 602 to remain asleep otherwise.

FIG. 12B illustrates a variation of the MAC superframe shown in FIG. 12A. As shown in FIG. 12B, the assigned management slot period 1201 may be positioned in the superframe to be at the beginning of the contention free period, before the guaranteed time slot period 703 so that the coordinator will have ample time to change assignments before the next beacon from the coordinator 601.

Figure 13:
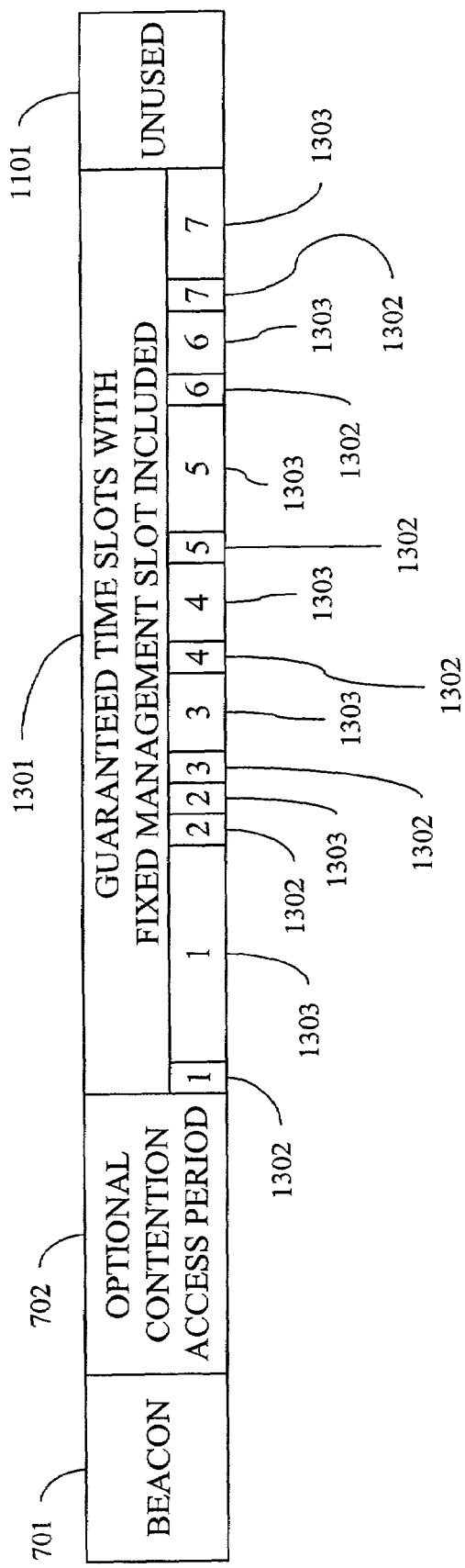
FIG. 13 illustrates an exemplary MAC superframe having guaranteed time slots with fixed management slots included according to one embodiment of the present invention.

FIG. 13 illustrates yet another variation of a MAC superframe using guaranteed time slots and including fixed management slots according to one embodiment of the present invention. As shown in FIG. 13, included in the guaranteed time slot period is a fixed management slot "piggybacking" with the guaranteed time slot. This period of the MAC superframe is shown as Figure item 1301. Accordingly, prior to each guaranteed time slot period 1303, is a fixed management slot period 1302 corresponding to that same user device 602. In one embodiment of the present invention, any unused period 1101 is used in a slot cycle TDMA scheme or a polling scheme managed by the coordinator.

Figure 14:
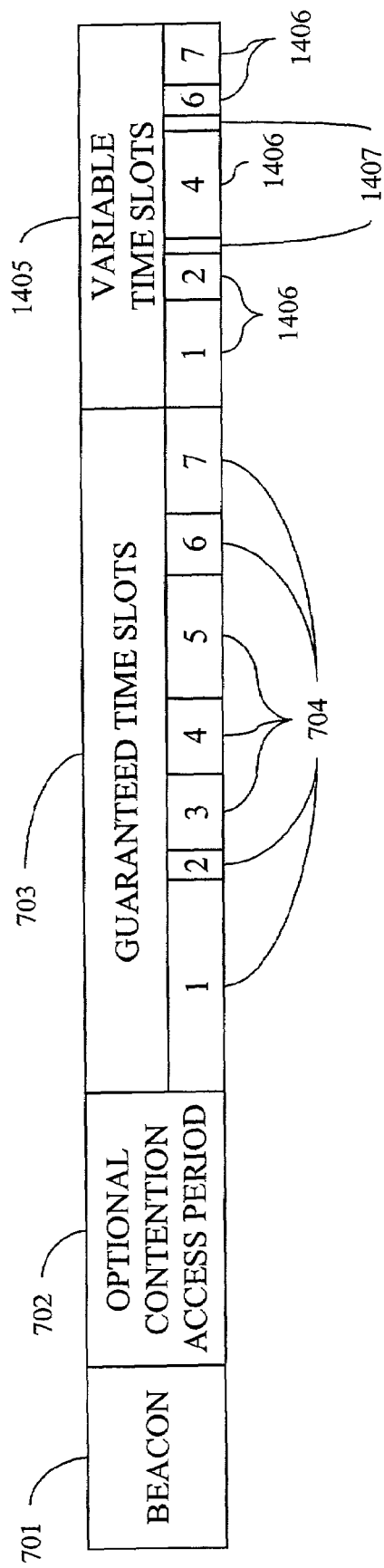
FIG. 14 illustrates an exemplary MAC superframe having guaranteed time slots and variable time slots during the contention free period according to one embodiment of the present invention.

FIG. 14 illustrates a hybrid MAC superframe according to one embodiment of the present invention. As shown in FIG. 14, this superframe includes the beacon period 701, the optional contention access period 702, a guaranteed time slot period 703, and a variable time slot period 1405. The variable time slot period 1405 is managed by the coordinator 601 in a same manner as slot cycle TDMA or polling frames are managed as described in the "BACKGROUND OF THE INVENTION" section. During the variable time slot period 1405, each of the users must listen continuously in order to track the usage of the slots, and to detect the occurrence of a mini slot where a user has not used its allocated slot. As discussed above, under a slot cycle TDMA scheme, each user must transmit a request to send (RTS) to the coordinator, and wait for a clear to send in response, prior to transmitting during this variable time slot period 1405. Under a polling scheme, the coordinator will poll each user for a response. Illustrated in FIG. 14 is a variable time slot period 1405 including both user slots 1406, and mini slots 1407, which are used in the same manner as the mini slots described above in the context of the slot cycle TDMA scheme.

Figure 15:
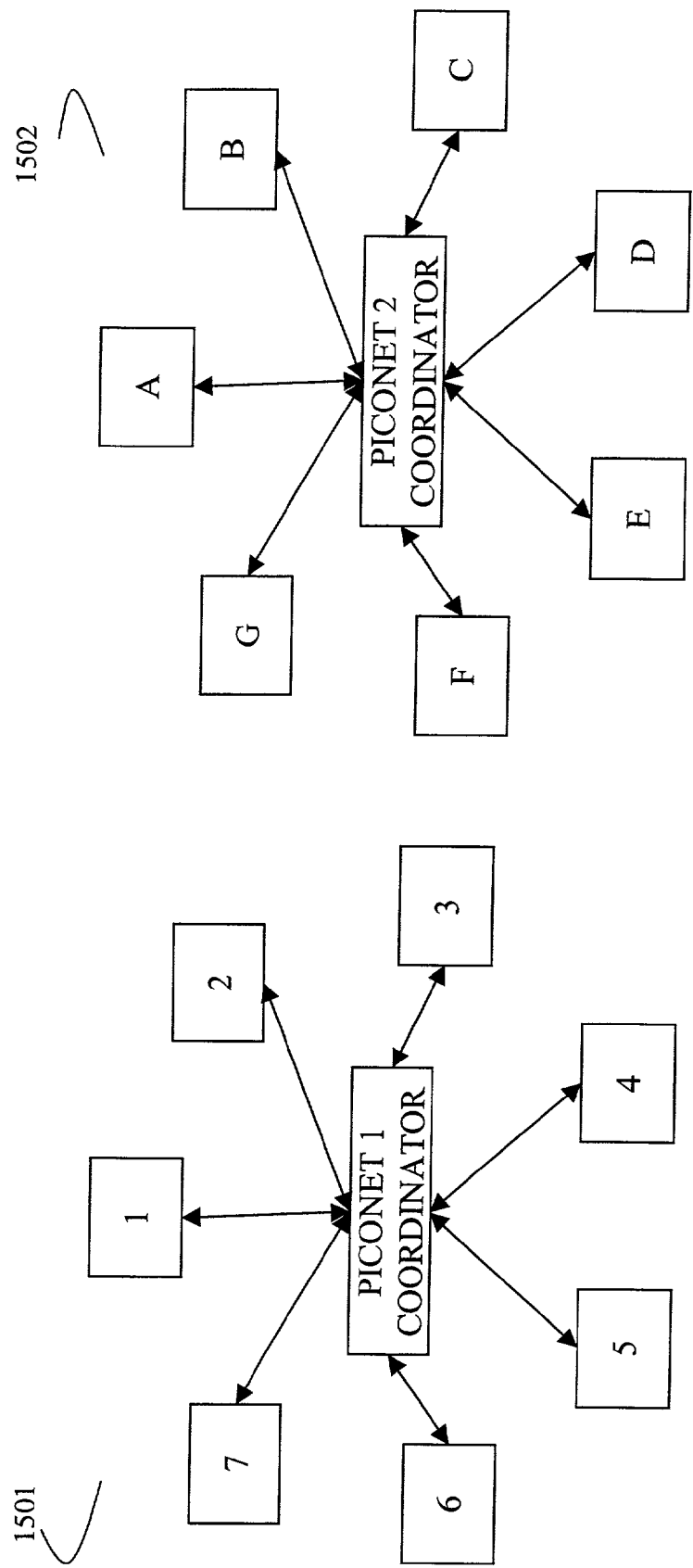
FIG. 15 is a block diagram illustrating two adjacent piconets.

FIG. 15 shows two adjacent piconets 1501, 1502 which are either co-located, or in close proximity. One problem confronted in designing wireless personal area networks or wireless local area networks is an overlapping network problem. As shown in FIG. 15, it is quite possible that the coordinator of piconet 1 1501 is capable of hearing devices belonging to piconet 2 1502. The inventor of the present invention has recognized that in using a guaranteed time slot scheme, that two adjacent piconets could share the same bandwidth by properly managing each piconet's use of its MAC frames.

Figure 16:
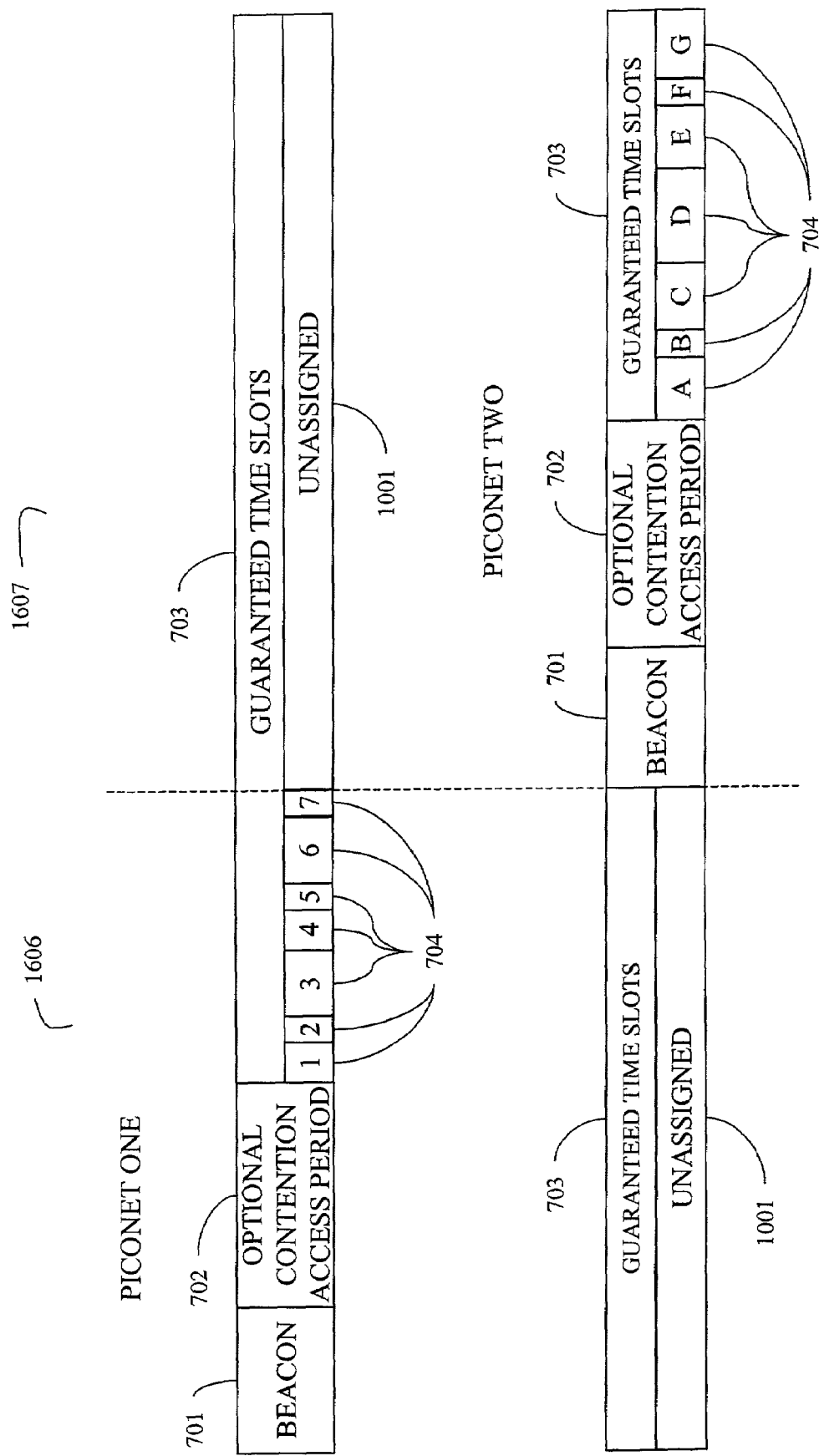
FIG. 16 illustrates the use of unassigned guaranteed time slots to allow two adjacent piconets to coordinate their activities according to one embodiment of the present invention.

FIG. 16 illustrates an exemplary scheme whereby two adjacent piconets can coexist according to one embodiment of the present invention. As shown in FIG. 16, the frame corresponding to piconet 1 1501 is managed such that each user of piconet 1 1501 gets a guaranteed time slot during a period in which the frame corresponding to piconet 2 1502 is unassigned. Accordingly, the unassigned portion 1001 of one piconet's guaranteed time slot portion 703 corresponds with the beacon period 701, optional contention access period 702, and allocated guaranteed time slots 704 of the other piconet. Using this approach, the devices of each piconet will not interfere with one another since the devices of one piconet are never transmitting during the assigned transmission time for the adjacent piconet.

Figure 17:
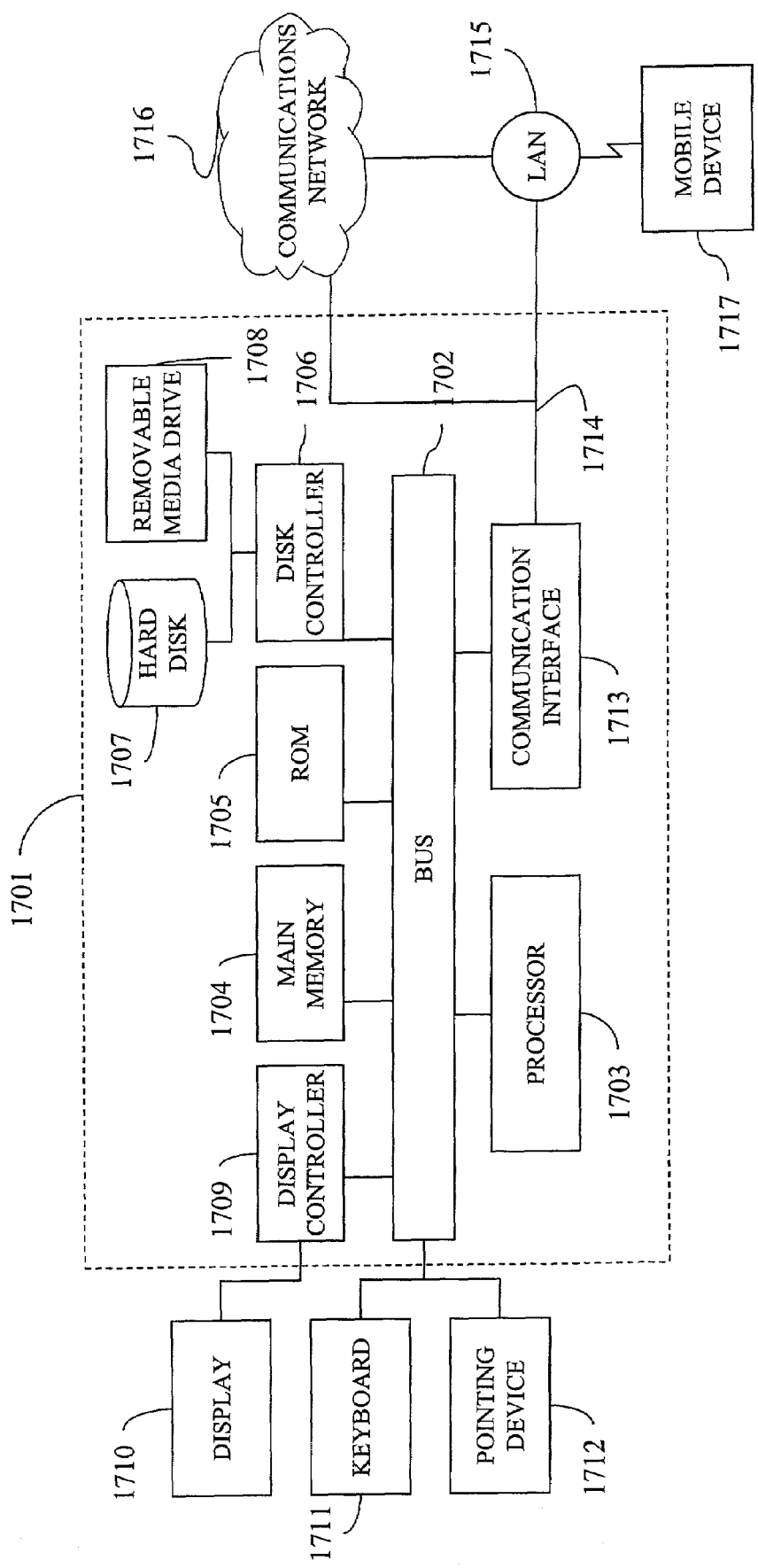
FIG. 17 is an exemplary computer system programmed to perform one or more of the special purpose functions of the present invention.

FIG. 17 illustrates a computer system 1701 upon which an embodiment of the present invention may be implemented. The computer system 1701 includes a bus 1702 or other communication mechanism for communicating information, and a processor 1703 coupled with the bus 1702 for processing the information. The computer system 1701 also includes a main memory 1704, such as a random access memory (RAM) or other dynamic storage device (e.g., dynamic RAM (DRAM), static RAM (SRAM), and synchronous DRAM (SDRAM)), coupled to the bus 1702 for storing information and instructions to be executed by processor 1703. In addition, the main memory 1704 may be used for storing temporary variables or other intermediate information during the execution of instructions by the processor 1703. The computer system 1701 further includes a read only memory (ROM) 1705 or other static storage device (e.g., programmable ROM (PROM), erasable PROM (EPROM), and electrically erasable PROM (EEPROM)) coupled to the bus 1702 for storing static information and instructions for the processor 1703.

The computer system 1701 also includes a disk controller 1706 coupled to the bus 1702 to control one or more storage devices for storing information and instructions, such as a magnetic hard disk 1707, and a removable media drive 1708 (e.g., floppy disk drive, read-only compact disc drive, read/write compact disc drive, compact disc jukebox, tape drive, and removable magneto-optical drive). The storage devices may be added to the computer system 1701 using an appropriate device interface (e.g., small computer system interface (SCSI), integrated device electronics (IDE), enhanced-IDE (E-IDE), direct memory access (DMA), or ultra-DMA).

The computer system 1701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1701 may also include a display controller 1709 coupled to the bus 1702 to control a display 1710, such as a cathode ray tube (CRT), for displaying information to a computer user. The computer system includes input devices, such as a keyboard 1711 and a pointing device 1712, for interacting with a computer user and providing information to the processor 1703. The pointing device 1712, for example, may be a mouse, a trackball, or a pointing stick for communicating direction information and command selections to the processor 1703 and for controlling cursor movement on the display 1710. In addition, a printer may provide printed listings of data stored and/or generated by the computer system 1701.

The computer system 1701 performs a portion or all of the processing steps of the invention in response to the processor 1703 executing one or more sequences of one or more instructions contained in a memory, such as the main memory 1704. Such instructions may be read into the main memory 1704 from another computer readable medium, such as a hard disk 1707 or a removable media drive 1708. One or more processors in a multi-processing arrangement may also be employed to execute the sequences of instructions contained in main memory 1704. In alternative embodiments, hard-wired circuitry may be used in place of or in combination with software instructions. Thus, embodiments are not limited to any specific combination of hardware circuitry and software.

As stated above, the computer system 1701 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1701, for driving a device or devices for implementing the invention, and for enabling the computer system 1701 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1703 for execution. A computer readable medium may take many forms, including but not limited to, non-volatile media, volatile media, and transmission media. Non-volatile media includes, for example, optical, magnetic disks, and magneto-optical disks, such as the hard disk 1707 or the removable media drive 1708. Volatile media includes dynamic memory, such as the main memory 1704. Transmission media includes coaxial cables, copper wire and fiber optics, including the wires that make up the bus 1702. Transmission media also may also take the form of acoustic or light waves, such as those generated during radio wave and infrared data communications.

Various forms of computer readable media may be involved in carrying out one or more sequences of one or more instructions to processor 1703 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1701 may receive the data on the telephone line and use an infrared transmitter to convert the data to an infrared signal. An infrared detector coupled to the bus 1702 can receive the data carried in the infrared signal and place the data on the bus 1702. The bus 1702 carries the data to the main memory 1704, from which the processor 1703 retrieves and executes the instructions. The instructions received by the main memory 1704 may optionally be stored on storage device 1707 or 1708 either before or after execution by processor 1703.

The computer system 1701 also includes a communication interface 1713 coupled to the bus 1702. The communication interface 1713 provides a two-way data communication coupling to a network link 1714 that is connected to, for example, a local area network (LAN) 1715, or to another communications network 1716 such as the Internet. For example, the communication interface 1713 may be a network interface card to attach to any packet switched LAN. As another example, the communication interface 1713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1713 sends and receives electrical, electromagnetic or optical signals that carry digital data streams representing various types of information.

The network link 1714 typically provides data communication through one or more networks to other data devices. For example, the network link 1714 may provide a connection to a another computer through a local network 1715 (e.g., a LAN) or through equipment operated by a service provider, which provides communication services through a communications network 1716. In preferred embodiments, the local network 1714 and the communications network 1716 preferably use electrical, electromagnetic, or optical signals that carry digital data streams. The signals through the various networks and the signals on the network link 1714 and through the communication interface 1713, which carry the digital data to and from the computer system 1701, are exemplary forms of carrier waves transporting the information. The computer system 1701 can transmit and receive data, including program code, through the network(s) 1715 and 1716, the network link 1714 and the communication interface 1713. Moreover, the network link 1714 may provide a connection through a LAN 1715 to a mobile device 1717 such as a personal digital assistant (PDA) laptop computer, or cellular telephone. The LAN communications network 1715 and the communications network 1716 both use electrical, electromagnetic or optical signals that carry digital data streams. The signals through the various networks and the signals on the network link 1714 and through the communication interface 1713, which carry the digital data to and from the system 1701, are exemplary forms of carrier waves transporting the information. The processor system 1701 can transmit notifications and receive data, including program code, through the network(s), the network link 1714 and the communication interface 1713.

Obviously, numerous modifications and variations of the present invention are possible in light of the above teachings. It is therefore to be understood that within the scope of the appended claims, the invention may be practiced otherwise than as specifically described herein.

What is claimed is:

1. A method for sharing bandwidth by a plurality of devices in at least one of a wireless personal area network and a local area network, comprising the steps of:

sending from a coordinator a beacon including coordination information to each of the plurality of devices, the beacon including for each of the plurality of devices
a device-unique start time indicator corresponding to an exclusive guaranteed time slot for a preselected device of the plurality of devices to transmit data,
a transmission duration corresponding to a duration of the exclusive guaranteed time slot, and
a shared time slot start time indicator corresponding to a shared time slot separate from the exclusive guaranteed time slots and shared by the plurality of devices;

receiving the beacon by the plurality of devices;

storing the device-unique start time indicator and the transmission duration in a memory of each preselected device;

sleeping after the storing step such that the plurality of devices are not receiving data and not transmitting data while sleeping;

transmitting, by each of the plurality of devices, at respective times corresponding to the device-unique start time stored in the memory of each preselected device and for the transmission duration stored in the memory of the preselected device;

returning to sleep, after the transmitting step such that the plurality of devices are not receiving data and are not transmitting data while sleeping; and waking up at a predetermined time such that another beacon can be received by the plurality of devices, wherein each device-unique start time and each transmission duration is set so that only one of the plurality of devices is transmitting at any one time during a period of time including each of the exclusive guaranteed time slots, and the shared time slot is used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent guaranteed time slot.

2. The method of claim 1, wherein the transmitting step further comprises:
waking up by another of the plurality of devices;
receiving, by the another of the plurality of devices, data transmitted during the transmission duration; and
returning to sleep, after the receiving step such that the another of the plurality of devices is not receiving data and not transmitting data while sleeping, wherein
the beacon further includes a receive indicator corresponding to another exclusive guaranteed time slot during which the another of the plurality of devices is to receive the data transmitted.

3. The method of claim 1, wherein the reservation period comprises at least one of a random access reservation slot period and an assigned reservation slot period.

4. A wireless network comprising:
a coordinator; and
a plurality of devices configured to share bandwidth according to a protocol, wherein the protocol includes
a beacon period for transmitting coordination information from the coordinator to the plurality of devices,
a contention free period following the beacon period for providing an exclusive guaranteed time slot to each of the plurality of devices to transmit data such that only one of the plurality of devices is transmitting at any one time, and
a shared time period following the beacon period used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent frame, wherein
each exclusive guaranteed time slot has a respective predetermined duration, and
the plurality of devices are sleeping when not receiving the beacon and not transmitting or receiving data such that the plurality of devices are not receiving data and not transmitting data while sleeping.

5. The wireless network of claim 4, wherein the shared time period follows the contention free period.

6. The wireless network of claim 4, wherein the contention free period follows the shared time period.

7. The wireless network of claim 4, wherein the reservation period comprises at least one of a random access reservation slot period and an assigned reservation slot period.

8. The wireless network of claim 4, wherein the wireless network comprises at least one of a wireless personal area network and a wireless local area network.

9. A wireless network comprising:
a coordinator; and
a plurality of devices configured to share bandwidth according to a protocol, wherein the protocol includes
a beacon period for transmitting coordination information from the coordinator to the plurality of devices,
an optional contention access period following the beacon period for each of the plurality of devices to optionally transmit a control message to the coordinator and for the coordinator to transmit a control response to the control message, and
a contention free period following the optional contention access period for providing an exclusive guaranteed time slot to each of the plurality of devices to transmit data such that only one of the plurality of devices is transmitting at any one time, and
a shared time period following the beacon period used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent frame, wherein
each exclusive guaranteed time slot has a respective predetermined duration, and
the plurality of devices are sleeping when not receiving the beacon, not transmitting data, not receiving data, and not transmitting a control message such that the plurality of devices are not receiving data and not transmitting data while sleeping.

10. The wireless network of claim 9, wherein the shared time period follows the contention free period.

11. The wireless network of claim 9, wherein the contention free period follows the shared time period.

12. The wireless network of claim 9, wherein the reservation period comprises at least one of a random access reservation slot period and an assigned reservation slot period.

13. The wireless network of claim 9, wherein the wireless network comprises at least one of a wireless personal area network and a wireless local area network.

14. A wireless network comprising:
a coordinator; and
a plurality of devices configured to share bandwidth according to a protocol, wherein the protocol includes
a beacon period for transmitting coordination information from the coordinator to the plurality of devices,
a contention free period following the beacon period for providing an exclusive guaranteed time slot to each of the plurality of devices to transmit data such that only one of the plurality of devices is transmitting at any one time, and
a reservation period following the contention free period for each of the plurality of devices to optionally transmit a reservation request message to the coordinator, wherein
each exclusive guaranteed time slot has a respective predetermined duration, and
the plurality of devices are sleeping when not receiving the beacon, not transmitting data, not receiving data, and not transmitting a reservation request messages such that the plurality of devices are not receiving data and not transmitting data while sleeping.

15. The network of claim 14, wherein the reservation period provides random access to the plurality of devices to optionally transmit a respective reservation request message.

16. The network of claim 14, wherein the reservation period comprises an exclusive assigned reservation slot for each of the plurality of devices such that each of the plurality of devices optionally transmits a reservation request message during a corresponding exclusive assigned reservation slot.

17. The wireless network of claim 14, wherein the wireless network comprises at least one of a wireless personal area network and a wireless local area network.

18. A wireless network comprising:
a coordinator; and
a plurality of devices configured to share bandwidth according to a protocol, wherein the protocol includes
a beacon period for transmitting coordination information from the coordinator to the plurality of devices,
a contention free period following the beacon period for providing an exclusive guaranteed time slot to each of the plurality of devices to transmit data such that only one of the plurality of devices is transmitting at any one time, each exclusive guaranteed time slot including an exclusive reservation slot for optionally transmitting a reservation request message to the coordinator, wherein
each exclusive guaranteed time slot has a respective predetermined duration, and
the plurality of devices are sleeping when not receiving the beacon, not transmitting data, not receiving data, and not transmitting a reservation request message such that the plurality of devices are not receiving data and not transmitting data while sleeping.

19. The wireless network of claim 18, wherein the wireless network comprises at least one of a wireless personal area network and a wireless local area network.

20. A system for sharing bandwidth in a wireless network, comprising:
a coordinator configured to transmit a beacon; and
a plurality of devices, each including
a receiver configured to receive the beacon, and
a transmitter configured to transmit data during an exclusive guaranteed time slot, wherein
the beacon includes for each of the plurality of devices
a device-unique start time indicator corresponding to the exclusive guaranteed time slot for a preselected device of the plurality of devices to transmit data,
a transmission duration corresponding to a duration of the exclusive guaranteed time slot, and
a shared time slot start time indicator corresponding to a shared time slot separate from the exclusive guaranteed time slots and shared by the plurality of devices,
the plurality of devices sleep when not receiving the beacon and not transmitting or receiving data such that the plurality of devices are not receiving data and not transmitting data while sleeping,
each device-unique start time and each transmission duration is set so that only one of the plurality of devices is transmitting at any one time during a period of time including each of the exclusive guaranteed time slots, and
the shared time slot is used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent guaranteed time slot.

21. The system of claim 20, wherein:
the plurality of devices are further configured to store the device-unique start time indicator and the transmission duration in a memory of the preselected device.

22. The system of claim 20, wherein:
the plurality of devices are further configured to wake up at a predetermined time such that another beacon can be received.

23. The system of claim 20, wherein the wireless network comprises at least one of a wireless personal area network and a wireless local area network.

24. A device for sharing bandwidth in a wireless network, comprising: a receiver configured to receive a beacon from a coordinator, and
a transmitter configured to transmit data during an exclusive guaranteed time slot, wherein
the beacon includes
a device-unique start time indicator corresponding to the exclusive guaranteed time slot for the device to transmit data,
a transmission duration corresponding to a duration of the exclusive guaranteed time slot, and
a shared time slot start time indicator corresponding to a shared time slot separate from the exclusive guaranteed time slots and shared by the plurality of devices,
the device sleeps when not receiving the beacon and not transmitting or receiving data such that the device is not receiving data and not transmitting data while sleeping,
the device-unique start time and transmission duration are set so that no other devices of the wireless personal area network are transmitting during the exclusive guaranteed time slot during a period of time including each of the exclusive guaranteed time slots, and
the shared time slot is used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent guaranteed time slot.

25. The device of claim 24, wherein the wireless network comprises at least one of a wireless personal area network and a wireless local area network.

26. A coordinator for managing the sharing of bandwidth in a wireless network, comprising:
a transmitter configured to transmit a beacon to a plurality of devices of the wireless personal area network, wherein
the beacon includes for each of the plurality of devices
a device-unique start time indicator corresponding to an exclusive guaranteed time slot for a preselected device of the plurality of devices to transmit data,
a transmission duration corresponding to a duration of the exclusive guaranteed time slot, and
a shared time slot start time indicator corresponding to a shared time slot separate from the exclusive guaranteed time slots and shared by the plurality of devices,
the coordinator sleeps when not transmitting the beacon such that the coordinator is not receiving data and not transmitting data while sleeping, each device-unique start time and each transmission duration is set so that only one of the plurality of devices is transmitting at any one time, and
the shared time slot is used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent guaranteed time slot.

27. The coordinator of claim 26, wherein the wireless network comprises at least one of a wireless personal area network and a wireless local area network.

28. A computer program product, comprising:
a computer storage medium; and
a computer program code mechanism embedded in the computer storage medium for causing a computer to coordinate the sharing of bandwidth in a wireless network, the computer program code mechanism having
a first computer code device configured to generate a beacon signal to be transmitted to a plurality of devices of the wireless personal area network, the beacon including for each of the plurality of devices
a device-unique start time indicator corresponding to an exclusive guaranteed time slot for a preselected device of the plurality of devices to transmit data,
a transmission duration corresponding to a duration of the exclusive guaranteed time slot, and
a shared time slot start time indicator corresponding to a shared time slot separate from the exclusive guaranteed time slots and shared by the plurality of devices, wherein
each device-unique start time and each transmission duration being set so that only one of the plurality of devices is transmitting at any one time, and
the shared time slot is used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent guaranteed time slot.

29. The computer program product of claim 28, wherein:
the computer program code mechanism further has a second computer code device configured to receive control messages from the plurality of devices and to generate control responses to be transmitted to the plurality of devices after the beacon signal has been transmitted and before the earliest of the device-unique start times.

30. The computer program product of claim 28, wherein the wireless network comprises at least one of a wireless personal area network and a wireless local area network.

31. A system for sharing bandwidth by a plurality of devices in a wireless network, comprising:
means for sending from a coordinator a beacon including coordination information to each of the plurality of devices, the beacon including for each of the plurality of devices
a device-unique start time indicator corresponding to an exclusive guaranteed time slot for a preselected device of the plurality of devices to transmit data,
a transmission duration corresponding to a duration of the exclusive guaranteed time slot, and
a shared time slot start time indicator corresponding to a shared time slot separate from the exclusive guaranteed time slots and shared by the plurality of devices;
means for receiving the beacon by the plurality of devices;

means for storing the device-unique start time indicator and the transmission duration in a memory of each preselected device;
means for sleeping after device-unique start time indicators and the transmission durations have been stored such that the plurality of devices are not receiving data and not transmitting data while sleeping;
means for transmitting, by each of the plurality of devices, at respective times corresponding to the device-unique start time stored in the memory of each preselected device and for the transmission duration stored in the memory of the preselected device;
means for returning to sleep, after each of the plurality of devices has transmitted such that the plurality of devices are not receiving data and are not transmitting data while sleeping; and
means for waking up at a predetermined time such that another beacon can be received by the plurality of devices, wherein
each device-unique start time and each transmission duration is set so that only one of the plurality of devices is transmitting at any one time during a period of time including each of the exclusive guaranteed time slots, and
the shared time slot is used as at least one of a slot cycle time division multiple access period managed by the coordinator for additional transmissions by the plurality of devices, a polling period managed by the coordinator for additional transmissions by the plurality of devices, and a reservation period for reserving time by the plurality of devices in a subsequent guaranteed time slot.

32. The system of claim 31, wherein the wireless network comprises at least one of a wireless personal area network and a wireless local area network.

33. A wireless network comprising:
a coordinator; and
a plurality of devices configured to share bandwidth according to a protocol, wherein the protocol includes
a beacon period for transmitting coordination information from the coordinator to the plurality of devices, and
a contention free period including
a guaranteed time slot period for providing an exclusive guaranteed time slot to each of the plurality of devices to transmit data such that only one of the plurality of devices is transmitting at any one time, each exclusive guaranteed time slot having a respective predetermined duration, and
a variable time slot period for providing an exclusive variable time slot to each of the plurality of devices to transmit data in a predetermined order, each exclusive variable time slot having a respective predetermined duration based on a packet size of data to be transmitted, wherein
the plurality of devices are sleeping during the guaranteed time slot period when not transmitting or receiving data such that the plurality of devices are not receiving data and not transmitting data while sleeping, and
the variable time slot period is used as at least one of a slot cycle time division multiple access scheme period and a polling scheme period.

34. The network of claim 33, wherein:
each of the plurality of devices sends a request to send message to the controller and receives a clear to send message from the controller prior to transmitting data in their respective exclusive variable time slot.

35. The system of claim 33, wherein the wireless network comprises at least one of a wireless personal area network and a wireless local area network.

36. A wireless network comprising:
a coordinator; and
at least two piconets, each including at least one device configured to share bandwidth according to a protocol, wherein
the protocol includes for each of the at least two piconets
a beacon period for transmitting coordination information from the coordinator to the at least one device of each of the at least two piconets, and
a contention free period following the beacon period for providing an exclusive guaranteed time slot to each of the at least one device of each of the at least two piconets to transmit data such that only one of the at least one device of each of the at least two piconets is transmitting at any one time, wherein
each exclusive guaranteed time slot has a respective predetermined duration,
the contention free period includes an unused portion,
the unused portion for a first of the at least two piconets is coordinated to coincide with the beacon period, the exclusive guaranteed time slots of the contention free period, and the shared time period for a second of the at least two piconets such that the at least one device of the first of the at least two piconets do not transmit at a same time as the at least one device of the second of the at least two piconets, and
each of the at least one device of each of the at least two piconets are sleeping when not receiving the beacon and not transmitting or receiving data such that the at least one device of each of the at least two piconets are not receiving data and not transmitting data while sleeping.

37. The wireless network of claim 36, wherein the wireless network comprises at least one of a wireless personal area network and a wireless local area network.

38. The wireless network of claim 36, wherein:
the protocol further includes an optional contention access period following the beacon period for each of the at least one device of each of the at least two piconets to optionally transmit a control message to the coordinator and for the coordinator to transmit a control response to the control message.

39. The wireless network of claim 36, wherein:
the protocol further includes a shared time period following the beacon period used as at least one of a slot cycle time division multiple access period managed by the coordinator for additional transmissions by the at least one device, a polling period managed by the coordinator for additional transmissions by the at least one device, and a reservation period for reserving time by the at least one device in a subsequent frame, wherein
the unused portion for a first of the at least two piconets is further coordinated to coincide with the shared time period for a second of the at least two piconets.

40. The wireless network of claim 39, wherein the shared time period follows the contention free period.

41. The wireless network of claim 39, wherein the contention free period follows the shared time period.

42. The wireless network of claim 39, wherein the reservation period comprises at least one of a random access reservation slot period and an assigned reservation slot period.

* * * * *

UNITED STATES PATENT AND TRADEMARK OFFICE
CERTIFICATE OF CORRECTION

| | | |
|---|---|---|
| PATENT NO. | : 7,110,380 B2 | Page 1 of 1 |
| APPLICATION NO. | : 10/067423 | |
| DATED | : September 19, 2006 | |
| INVENTOR(S) | : William M. Shvodian | |

It is certified that error appears in the above-identified patent and that said Letters Patent is hereby corrected as shown below:

In Column 16, Line 54, Claim No. 14:

Change "reservation request messages" to -- reservation request message --

Signed and Sealed this

Twelfth Day of August, 2008

JON W. DUDAS
*Director of the United States Patent and Trademark Office*